US012680270B2

(12) United States Patent
Yoshida et al.

(10) Patent No.: US 12,680,270 B2
(45) Date of Patent: Jul. 14, 2026

(54) LEVER DEVICE AND WORKING MACHINE INCLUDING THE SAME

(71) Applicant: Kubota Corporation, Osaka (JP)

(72) Inventors: Kenichiro Yoshida, Sakai (JP); Yoshinori Torii, Sakai (JP); Hajime Nomura, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 19/176,269

(22) Filed: Apr. 11, 2025

(65) Prior Publication Data

US 2025/0263904 A1 Aug. 21, 2025

Related U.S. Application Data

(63) Continuation of application No. PCT/JP2023/046115, filed on Dec. 22, 2023.

(30) Foreign Application Priority Data

Dec. 26, 2022 (JP) ................................ 2022-208916

(51) Int. Cl.
*E02F 9/20* (2006.01)
*E02F 9/16* (2006.01)
(Continued)

(52) U.S. Cl.
CPC ............ *E02F 9/2004* (2013.01); *E02F 9/166* (2013.01); *G05G 1/04* (2013.01); *G05G 5/005* (2013.01); *G05G 5/05* (2013.01)

(58) Field of Classification Search
CPC .......... E02F 9/166; E02F 9/2004; G05G 1/04; G05G 5/005; G05G 5/05
See application file for complete search history.

(56) References Cited

U.S. PATENT DOCUMENTS 6,352,133 B1 * 3/2002 Ojima ........................ E02F 9/16 180/326
12,054,912 B2 * 8/2024 Arnal .................... E02F 9/2004
(Continued)

FOREIGN PATENT DOCUMENTS

| | | | |
|---|---|---|---|
| JP | H07331704 A * | 12/1995 | E02F 9/2004 |
| JP | 2012127137 A * | 7/2012 | |
| JP | 2019116753 A | 7/2019 | |

OTHER PUBLICATIONS

English translation of JP-2012127137-A (Year: 2012).*
English translation of JP-H07331704-A (Year: 1995).*

*Primary Examiner* — Joseph Brown
(74) *Attorney, Agent, or Firm* — Keating & Bennett, LLP

(57) ABSTRACT

A lever device includes a switching mechanism to switch a direction of a biasing force of a tension spring on a lever rotatably supported by a movable body via a second support shaft. The switching mechanism includes a rotational body to rotate together with the lever and including a first spring hook portion and a first engagement portion positioned with an axis of the second support shaft therebetween, and a link rotatably supported by the movable body via a third support shaft and including a second spring hook portion and a second engagement portion positioned with an axis of the third support shaft therebetween. As the first engagement portion is moved by rotation of the rotational body about the second support shaft, the second engagement portion rotates about the third support shaft to move the second spring hook portion to a side to which the first spring hook portion moves.

8 Claims, 23 Drawing Sheets

(51) Int. Cl.

| | |
|---|---|
| ***G05G 1/04*** | (2006.01) |
| ***G05G 5/00*** | (2006.01) |
| ***G05G 5/05*** | (2006.01) |

(56) References Cited

U.S. PATENT DOCUMENTS

| | | | | |
|---|---|---|---|---|
| 2006/0232116 | A1* | 10/2006 | Jang | E02F 9/24 297/354.1 |
| 2017/0285681 | A1* | 10/2017 | Nishigori | G05G 5/005 |
| 2020/0299931 | A1 | 9/2020 | Nishigori et al. | |

* cited by examiner

LEVER DEVICE AND WORKING MACHINE INCLUDING THE SAME

CROSS REFERENCE TO RELATED APPLICATIONS

This application is a continuation application of International Application No. PCT/JP2023/046115, filed on Dec. 22, 2023, which claims the benefit of priority to Japanese Patent Application No. 2022-208916, filed on Dec. 26, 2022. The entire contents of each of these applications are hereby incorporated herein by reference.

BACKGROUND OF THE INVENTION

1. Field of the Invention

The present invention relates to lever devices and working machines including such lever devices.

2. Description of the Related Art

A lever device disclosed in Japanese Unexamined Patent Application Publication No. 2019-116753 is known.

A lever device disclosed in Japanese Unexamined Patent Application Publication No. 2019-116753 includes a movable body supported by a fixed body (support bracket) fixed to a machine body so as to be rotatable between a lowered position and a raised position in which the movable body has rotated upward from the lowered position, and a lever to be operated to rotate the movable body. The lever is operable between a pushed-down position and a pulled-up position in which the lever has been pulled up from the pushed-down position, and the movable body is rotationally operated between the lowered position and the raised position by the lever being operated between the pushed-down position and the pulled-up position. Also, the lever is held in the pushed-down position and the pulled-up position by the biasing force of a tension spring. The direction of the biasing force of the tension spring is switched by a switching mechanism. The switching mechanism switches the direction of the biasing force of the tension spring so that the biasing force acts in a direction in which the lever is pulled down in the pushed-down position and the biasing force acts in a direction in which the lever is pulled up in the pulled-up position.

SUMMARY OF THE INVENTION

However, depending on the location at which the lever device is installed, there is a case where the rotation angle (rotation amount) of the movable body cannot be made large. When the rotation angle of the movable body is small, the rotation angle of the lever cannot be made large, and it is difficult to sufficiently exert the biasing force of the tension spring on the lever in the pushed-down position and the pulled-up position.

Example embodiments of the present invention provide lever devices each of which is capable of exerting a biasing force of a tension spring on a lever even when an angle of rotation of a movable body is small, and working machines each including such lever devices.

A lever device according to an example embodiment of the present invention includes a fixed body, a movable body rotatably supported by the fixed body via a first support shaft, a lever to be operated to rotate the movable body about the first support shaft, the lever being supported by a second support shaft provided at the movable body such that the lever is rotatable between a pushed-down position and a pulled-up position, the pulled-up position being a position of the lever rotated upward from the pushed-down position, a tension spring to bias the lever, and a switching mechanism to switch a direction of a biasing force of the tension spring to change between when the lever is in the pushed-down position and when the lever is in the pulled-up position such that the biasing force of the tension spring acts in a direction in which the lever is pulled down when the lever is in the pushed-down position and acts in a direction in which the lever is pulled up when the lever is in the pulled-up position, wherein the switching mechanism includes a rotational body to rotate together with the lever about the second support shaft, the rotational body including a first spring hook portion and a first engagement portion positioned such that an axis of the second support shaft is located between the first spring hook portion and the first engagement portion, and a link rotatably supported by the movable body via a third support shaft, the link including a second spring hook portion and a second engagement portion positioned such that an axis of the third support shaft is located between the second spring hook portion and the second engagement portion, the tension spring is connected between the first spring hook portion and the second spring hook portion, and the link is positioned such that the first engagement portion and the second engagement portion are engageable with each other and such that the first engagement portion is movable by rotation of the rotational body about the second support shaft to cause the second engagement portion to move and rotate about the third support shaft to move the second spring hook portion to a side to which the first spring hook portion moves.

One of the first engagement portion and the second engagement portion may include a pin parallel to the second support shaft or the third support shaft. The other of the first engagement portion and the second engagement portion may include a groove or a hole to receive the pin.

A side to which the first spring hook portion moves when the lever is pulled up may be a first side, and a side opposite to the first side may be a second side. The lever device may be configured such that the direction of the biasing force of the tension spring which acts on the lever as the lever is operated is switched between the direction in which the lever is pulled down and the direction in which the lever is pulled up because, when the lever is pulled up and the rotational body rotates about the second support shaft, the first spring hook portion moves to the first side while the first engagement portion and the second engagement portion move to the second side and the second spring hook portion moves to the first side, and when the lever is pushed down and the rotational body rotates about the second support shaft, the first spring hook portion moves to the second side while the first engagement portion and the second engagement portion move to the first side and the second spring hook portion moves to the second side.

The movable body may be rotatable between a lowered position and a raised position, the raised position being a position of the movable body rotated upward from the lowered position about the first support shaft. The pushed-down position of the lever may correspond to the lowered position of the movable body. The lever may be configured to be operated to a raising-operation position which is a position of the lever operated to rotate the movable body to the raised position. The pulled-up position of the lever may be a position of the lever further pulled up from the raising-operation position relative to the movable body in the raised position.

The lever device may further include a guide body provided at the fixed body, and a guide plate including a guide groove to receive the guide body and configured to rotate together with the lever about the second support shaft. The guide groove may include a first groove portion to restrict the movable body in the lowered position from rotating in a raising direction and allow the lever to rotate in the direction in which the lever is pulled up, a second groove portion to allow the movable body to rotate by an operation of the lever, and a third groove portion to restrict the movable body in the raised position from rotating in the raising direction and allow the lever to rotate about the second support shaft. The third groove portion may include a locking portion to restrict the movable body from rotating in a lowering direction from the raised position when the lever is in the pulled-up position.

The movable body may include a support tube to rotatably support the second support shaft about an axis thereof. The lever may be attached to the second support shaft at one of opposite ends in an axial direction of the support tube. The guide plate may be fixed to the second support shaft at the other of the opposite ends in the axial direction of the support tube.

A working machine according to an example embodiment of the present invention includes the above-described lever device.

The lever may be an operation lock lever to switch one or more actuators included in the working machine between an operable state and an inoperable state.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 9 is a perspective view of a fixed body and the like.

FIG. 10 is a perspective view of a movable body, a switching mechanism, and the like.

DETAILED DESCRIPTION OF THE EXAMPLE EMBODIMENTS

Figure 1:
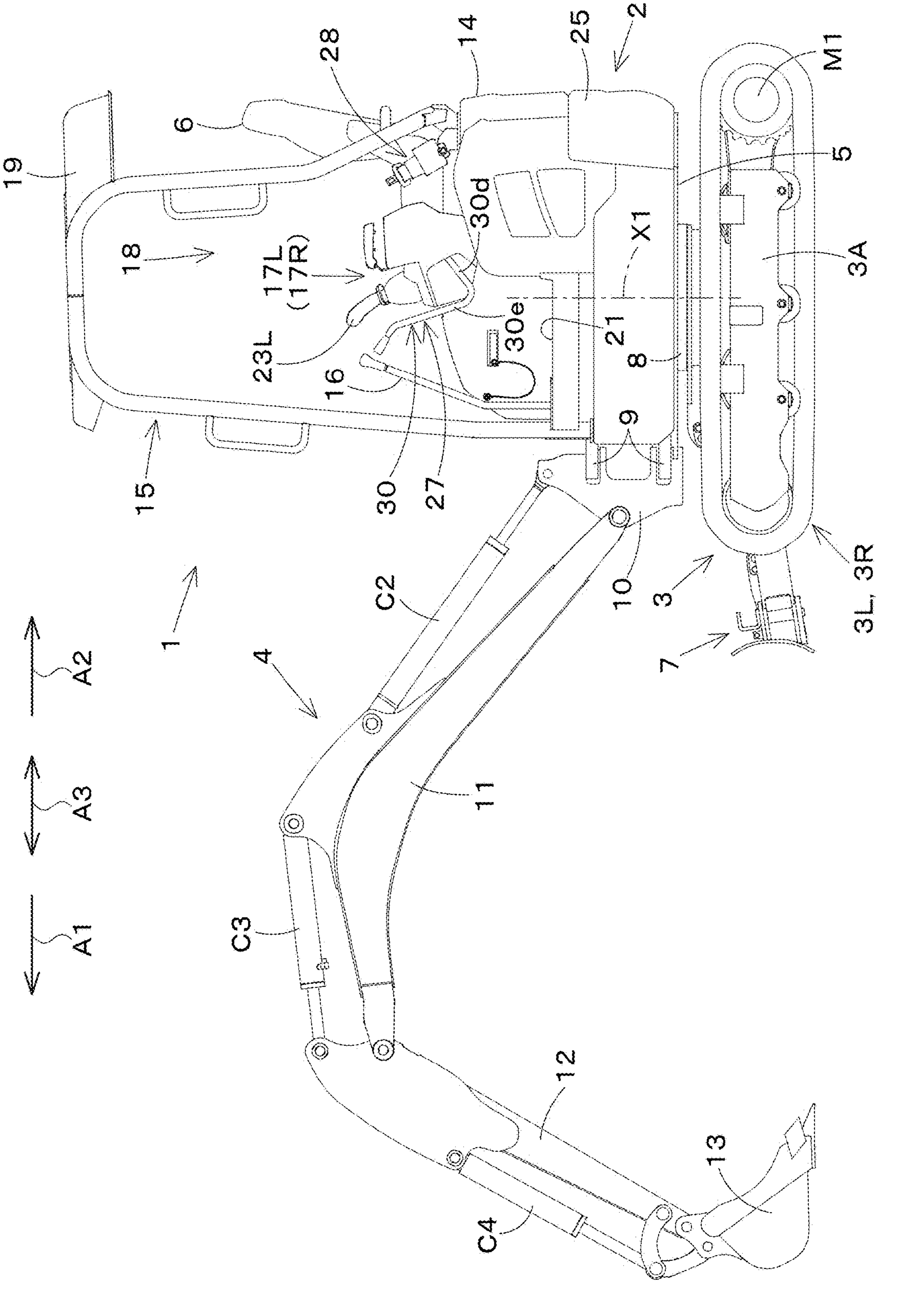
FIG. 1 is an overall side view of a working machine.

Example embodiments will now be described with reference to the accompanying drawings, wherein like reference numerals designate corresponding or identical elements throughout the various drawings. The drawings are to be viewed in an orientation in which the reference numerals are viewed correctly.

Hereinafter, example embodiments of the present invention will be described with reference to the drawings as appropriate.

FIG. 1 is a schematic side view illustrating an overall configuration of a working machine 1 according to the present example embodiment. In the present example embodiment, a backhoe, which is a turning working machine, is exemplified as the working machine 1.

As illustrated in FIG. 1, the working machine 1 includes a machine body (turning base) 2, a traveling device 3, and a working device 4. An operator's seat 6 on which an operator (driver) is seated and four-pillar-type ROPS 15 are mounted on the machine body 2. The ROPS 15 has a canopy specification including a roof 19.

In the present example embodiment, a direction toward the front of the operator seated on the operator's seat 6 of the working machine 1 (arrow A1 direction in FIG. 1) is described as a forward side (machine-body forward side), a direction toward the rear of the operator (arrow A2 direction in FIG. 1) is described as a rearward side (machine-body rearward side), and an arrow A3 direction in FIG. 1 is described as a front-rear direction (machine-body front-rear direction). Also, a direction toward the left of the operator (near side in FIG. 1) is described as a leftward side, and a direction toward the right of the operator (far side in FIG. 1) is described as a rightward side.

Also, a horizontal direction that is a direction orthogonal to the front-rear direction A3 is described as a machine-body width direction. A direction from a central portion to a right portion or a left portion in a width direction of the machine body 2 is described as an outward side in the machine-body width direction. That is, the outward side in the machine-body width direction is a direction away from the center in the width direction of the machine body 2 in the machine-body width direction. A direction opposite to the outward side in the machine-body width direction is described as an inward side in the machine-body width direction. That is, the inward side in the machine-body width direction is a direction toward the center in the width direction of the machine body 2 in the machine-body width direction.

As illustrated in FIG. 1, the traveling device 3 is a crawler type traveling device that supports the machine body 2 such that the machine body 2 is allowed to travel, and includes a traveling frame 3A, a first traveling device 3L provided leftward of the traveling frame 3A, and a second traveling device 3R provided rightward of the traveling frame 3A. The first traveling device 3L and the second traveling device 3R are driven by a traveling motor M1 which is a hydraulic motor (hydraulic actuator). In the present example embodiment, the crawler type traveling device 3 is used, but this does not imply any limitation, and a wheel type traveling device or the like may be used. A dozer device 7 is attached to a front portion of the traveling device 3. The dozer device 7 can be driven by a dozer cylinder which is a hydraulic cylinder (hydraulic actuator).

Figure 3:
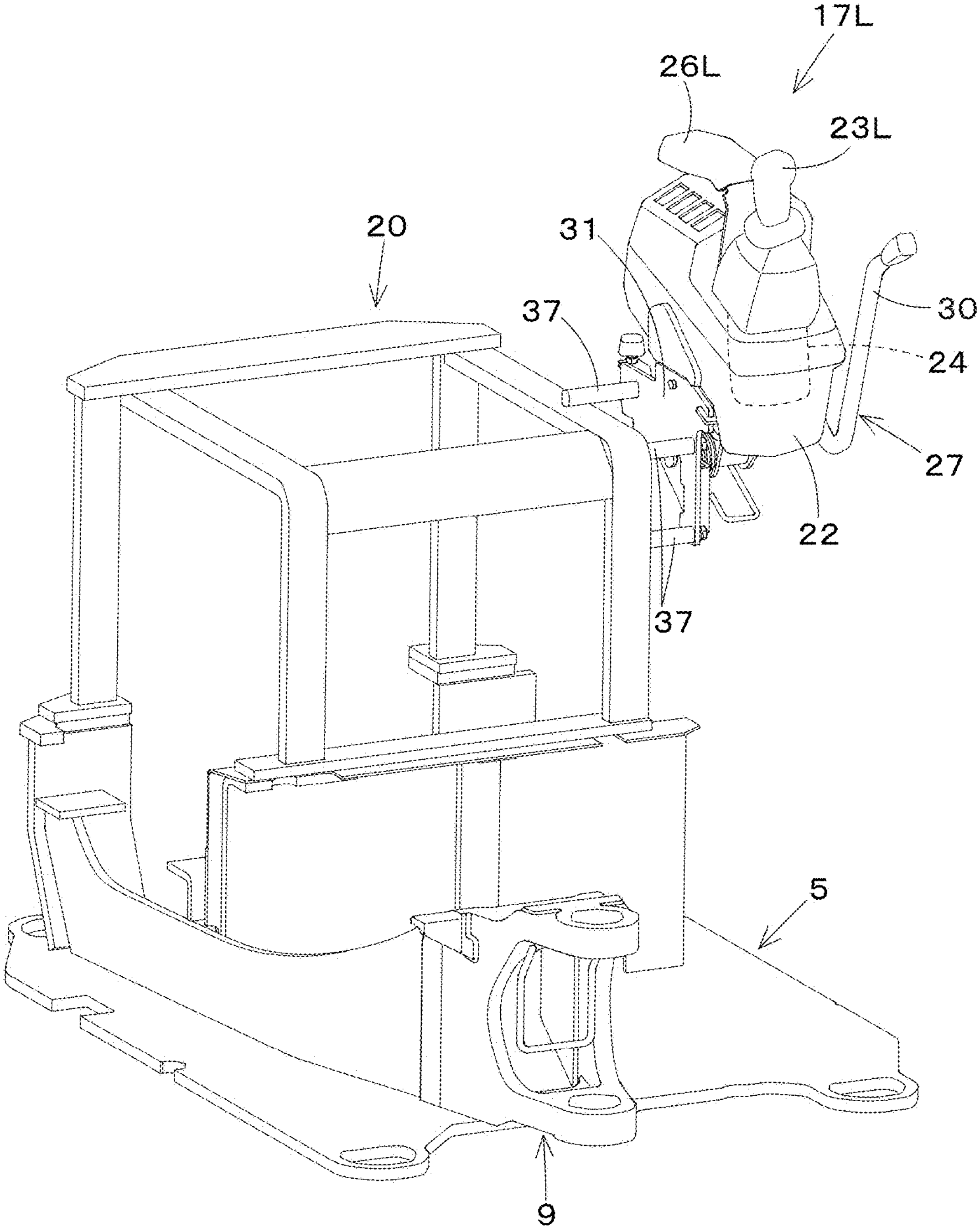
FIG. 3 is a perspective view illustrating a state in which a manipulating device is supported by a support frame.

As illustrated in FIG. 1, the machine body 2 includes a turning base plate 5 that includes a thick plate material and defines a bottom portion of the machine body 2 (see FIG. 3). The turning base plate 5 is supported on the traveling frame 3A of the traveling device 3 via a turning bearing 8 so as to be turnable about a turning axis X1 that is an axis extending in an up-down direction. The turning base plate 5 is driven to turn about the turning axis X1 by a turning motor (not illustrated). Additionally, the machine body 2 includes, in a front portion thereof, a support bracket 9 and a swing bracket 10 that support the working device 4. The support bracket 9 protrudes forward from the machine body 2. Specifically, the support bracket 9 is fixed to a front portion of the turning base plate 5 and protrudes forward from the turning base plate 5. The swing bracket 10 is attached to a front portion of the support bracket 9 so as to be swingable about a vertical axis (an axis extending in the up-down direction). A hood 14 that covers a mounted object such as a prime mover (engine) is provided on the machine body 2. A weight 25 that balances the weight with the working device 4 is provided at a rear portion of the machine body 2. The working machine 1 of the present example embodiment is a compact backhoe, and the operator's seat 6 is provided above the prime mover (prime mover chamber).

As illustrated in FIG. 1, the working device 4 includes a boom 11, an arm 12, and a bucket 13. A proximal portion of the boom 11 is pivotally attached to an upper portion of the swing bracket 10 so as to be rotatable about a horizontal axis (an axis extending in the machine-body width direction). The arm 12 is pivotally attached to a distal end portion of the boom 11 so as to be rotatable about a horizontal axis. The bucket 13 is provided at a distal end portion of the arm 12 so as to be capable of performing a shoveling motion and a dumping motion. The shoveling motion is a motion of swinging the bucket 13 in a direction toward the boom 11, and is, for example, a motion of shoveling earth and sand or the like. Also, the dumping motion is a motion of swinging the bucket 13 in a direction away from the boom 11, and is, for example, a motion of dropping (discharging) shoveled earth and sand or the like.

The swing bracket 10 is swingable by extension/contraction of a swing cylinder (not illustrated). The boom 11 is swingable by extension/contraction of a boom cylinder C2. The arm 12 is swingable by extension/contraction of an arm cylinder C3. The bucket 13 is capable of performing the shoveling motion and the dumping motion by extension/contraction of a bucket cylinder C4. The swing cylinder, the boom cylinder C2, the arm cylinder C3, and the bucket cylinder C4 are hydraulic cylinders (hydraulic actuators).

Figure 2:
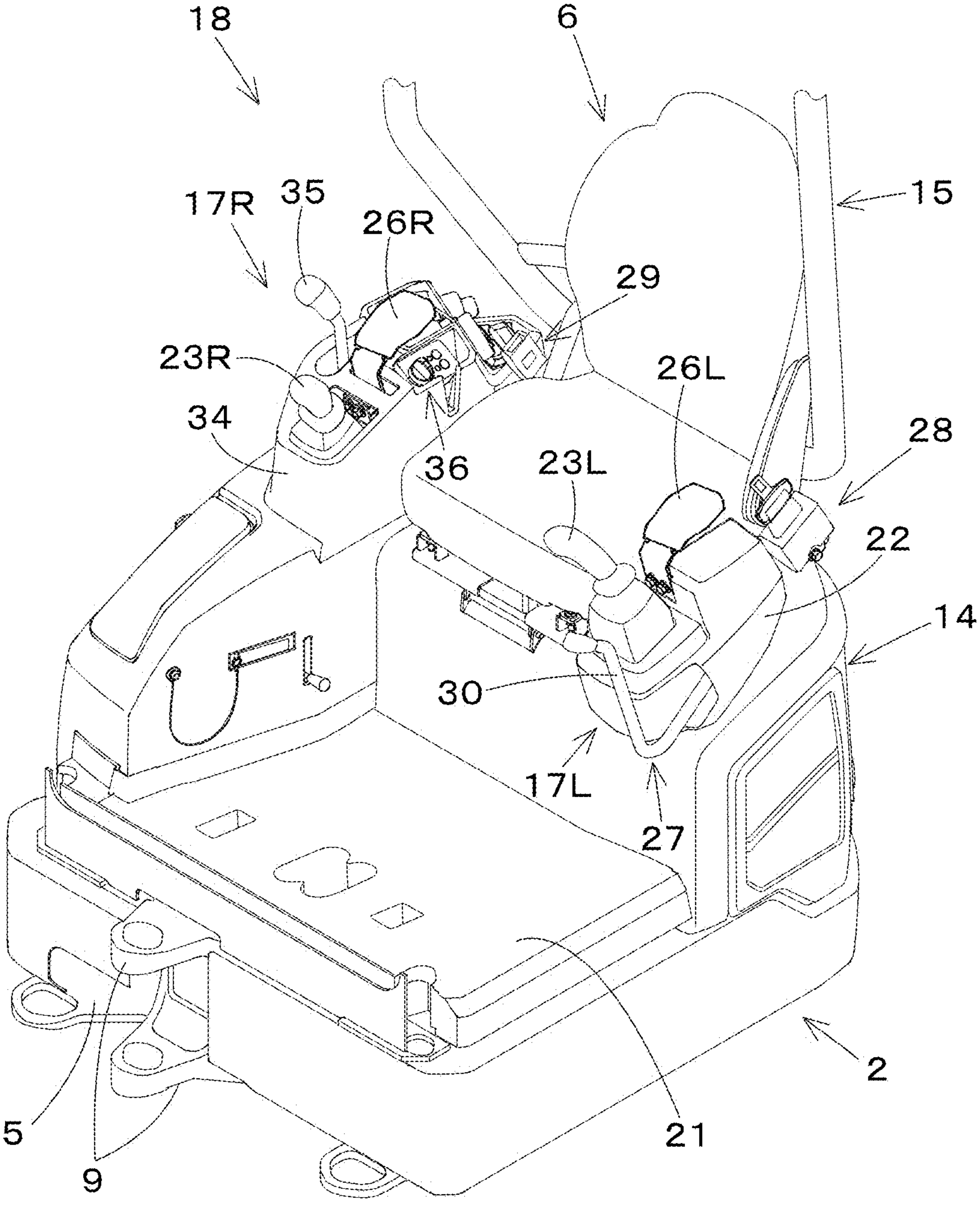
FIG. 2 is a perspective view of a machine body and an operation unit.

As illustrated in FIG. 2, an operation unit 18 is mounted on the machine body 2. The operation unit 18 includes the operator's seat 6, a traveling lever 16 (see FIG. 1) provided forward of the operator's seat 6, a manipulating device (left manipulating device) 17L provided leftward of the operator's seat 6 and a manipulating device (right manipulating device) 17R provided rightward of the operator's seat 6, and the like. The traveling lever 16 is an operation member that operates the traveling device 3. The manipulating devices 17L and 17R are devices that perform, for example, a swinging operation of the boom 11, a swinging operation of the arm 12, operations of the shoveling motion and the dumping motion of the bucket 13, a turning operation of the machine body 2, and the like. A floor portion 21 on which the operator places his/her feet is provided on an upper surface of the machine body 2 and forward of the operator's seat 6. The floor portion 21 includes, for example, a floor mat being laid on a step plate that is provided above the turning base plate 5 with a space therebetween and supported by the turning base plate 5.

As illustrated in FIG. 3, the left manipulating device 17L is attached to a support frame 20. The support frame 20 is a frame that supports the hood 14, the operator's seat 6, the ROPS 15, and the like, and is attached to a member fixed on the turning base plate 5. The left manipulating device 17L includes a console cover 22, a manipulating lever (left manipulating lever) 23L, a remote control valve 24, an armrest 26L, and a lever device 27.

The console cover 22 covers the remote control valve 24, the lever device 27, and the like. The left manipulating lever 23L is provided at a front and upper portion of the left manipulating device 17L, and is operable to be pivoted forward/rearward and leftward/rightward. The remote control valve 24 is a pilot valve that is operated with the left manipulating lever 23L, and is provided below the left manipulating lever 23L. The remote control valve 24 is housed in the console cover 22. The armrest 26L is a structure on which an elbow and the like of the operator is placed, and is provided rearward of the left manipulating lever 23L.

As illustrated in FIGS. 4 to 8, the lever device 27 includes a lever 30, a fixed body 31, a movable body 32, a tension spring 47, a switching mechanism 33, and a guide plate 52. A front portion of the lever 30 protrudes forward from the console cover 22 (see FIG. 2). A proximal portion of the lever 30, the movable body 32, the tension spring 47, and the switching mechanism 33 are covered with the console cover 22.

As illustrated in FIG. 2, the right manipulating device 17R includes a console cover 34, a manipulating lever (right manipulating lever) 23R, a remote control valve (not illustrated), an armrest 26R, a dozer lever 35, and a plurality of switches 36.

The console cover 34 covers a frame of the right manipulating device 17R. The frame of the right manipulating device 17R is attached to the machine body 2. The right manipulating lever 23R is provided at a front and upper portion of the right manipulating device 17R, and is operable to be pivoted forward/rearward and leftward/rightward. The remote control valve is a pilot valve that is operated with the right manipulating lever 23R, and is provided below the right manipulating lever 23R and covered with the console cover 34. The armrest 26R is a structure on which an elbow and the like of the operator is placed, and is provided rearward of the right manipulating lever 23R. The dozer lever 35 is a lever that operates the dozer device 7. The plurality of switches 36 are provided at an upper surface of the console cover 34, and are switches that operate various devices provided in the working machine 1.

The left manipulating lever 23L (remote control valve 24) can operate two operation targets (hydraulic actuators) provided in the working machine 1. For example, the left manipulating lever 23L can operate the turning motor that turns the machine body 2 (can operate the machine body 2 to turn) and can operate the arm cylinder C3 (can operate the arm 12 to swing).

The right manipulating lever 23R can also operate two operation targets (hydraulic actuators) provided in the working machine 1. For example, the right manipulating lever 23R can operate the boom cylinder C2 (can operate the boom 11 to swing) and can operate the bucket cylinder C4 (can operate the bucket 13 to swing).

As illustrated in FIG. 2, the operation unit 18 is provided with a seatbelt device. The seatbelt device includes a seatbelt to which a tongue is attached, a belt winding structure 28 including a retractor that winds and stores the seatbelt, and a buckle 29 that is engaged with the tongue. The belt winding structure 28 is provided leftward of a rear and lower portion of the operator's seat 6, and in the vicinity of the rear of the left manipulating device 17L. The belt winding structure 28 is attached to a stay (not illustrated) provided leftward of a rear and lower portion of the ROPS 15. The buckle 29 is provided rightward of the rear and lower portion of the operator's seat 6.

Next, the lever device 27 of the present example embodiment will be first schematically described.

The lever 30 is an operation lock lever (unload lever) that switches a hydraulic actuator mounted on the working machine 1 between an operable state and an inoperable state, and the lever device 27 is an operation lock lever device (unload lever device) including the operation lock lever. Thus, in the following description, the lever device 27 is described as the operation lock lever device, and the lever 30 is described as the operation lock lever. However, the lever device 27 is not limited to the operation lock lever device (unload lever device), and the lever 30 is not limited to the operation lock lever (unload lever). For example, the lever 30 may be an operation lock lever that switches an electric actuator (not illustrated) included in the working machine 1 between an operable state and an inoperable state, instead of the hydraulic actuator described above or in addition to the hydraulic actuator described above. Additionally or alternatively, the lever 30 may be an operation lock lever that outputs a signal to switch an actuator included in the working machine 1 between an operable state and an inoperable state to a controller that controls a motion of the actuator. Also, the lever 30 may be used for another purpose without being limited to the purpose of use for locking the operation of the actuator.

Next, respective portions (the operation lock lever 30, the fixed body 31, the movable body 32, the tension spring 47, the switching mechanism 33, the guide plate 52, and the like) of the lever device 27 will be described.

The operation lock lever 30 is operated to rotate the movable body 32 upward or downward (operated to raise or lower the movable body 32). As illustrated in FIG. 6, the operation lock lever 30 includes a lever proximal portion 30*b*, a lever main body 30*a*, and a grip 30*c*. The lever proximal portion 30*b* is rotatably supported by the movable body 32. In other words, the operation lock lever 30 is rotatably supported by the movable body 32. In a use state of the left manipulating device 17L illustrated in FIGS. 1 and 4, a lower section 30*d* of the lever main body 30*a* is inclined obliquely forward and downward, and a front section 30*e* extends obliquely forward and upward from a front portion of the lower section 30*d*. The grip 30*c* is a section for being gripped and is provided on an upper portion of the front section 30*e* of the lever main body 30*a*. Also, the lever main body 30*a* is provided leftward of the left manipulating lever 23L (see FIG. 2). The operation lock lever 30 is located in a position to hinder the operator from getting on/off the working machine 1 in the use state of the left manipulating device 17L. Also, in a non-use state of the left manipulating device 17L illustrated in FIG. 5, in which the operation lock lever 30 has rotated rearward and upward together with the movable body 32 from the use state, the operation lock lever 30 is located in a position retracted from a passage for the operator to get on/off.

Figure 9:
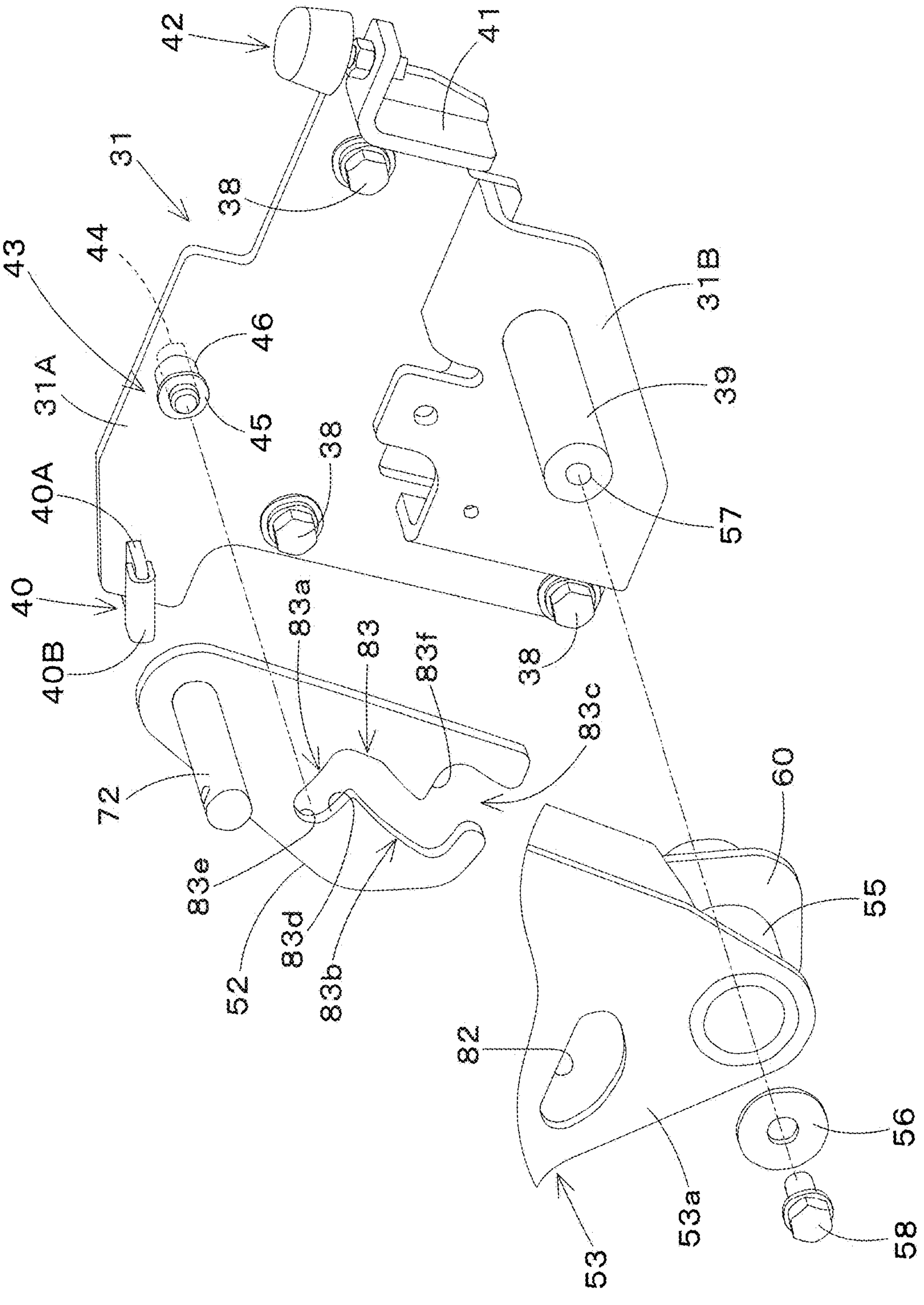

As illustrated in FIG. 3, the fixed body 31 is attached to the support frame 20. Specifically, the fixed body 31 is fixed to a plurality of rods 37 fixed to the support frame 20 by bolts 38 (see FIG. 9). As illustrated in FIG. 9, the fixed body 31 includes a first structure 31A and a second structure 31B made of plate materials. The first structure 31A defines an upper and front portion of the fixed body 31, and the second structure 31B defines a rear and lower portion of the fixed body 31.

As illustrated in FIG. 9, a support shaft (first support shaft) 39 is provided at the rear and lower portion (second structure 31B) of the fixed body 31. Specifically, the first support shaft 39 has an axis extending in the machine-body width direction, has a right end portion fixed to the second structure 31B, and protrudes leftward. A receiver 40 is provided at the upper and front portion of the fixed body 31 (first structure 31A). The receiver 40 includes an elastic material 40B such as rubber being fixed to a stay plate 40A fixed to a front portion of the first structure 31A. A guide body 43 is provided at an upper portion and a middle portion in the front-rear direction of the fixed body 31 (first structure 31A). The guide body 43 includes a support pin 44, a roller 46, a washer 45, and the like. The support pin 44 is a rod having an axis extending in the machine-body width direction, penetrates through the first structure 31A, and is fixed to the first structure 31A. The support pin 44 protrudes leftward from the first structure 31A. The roller 46 is provided leftward of the first structure 31A and is fitted onto the support pin 44 so as to be rotatable about the axis thereof. The washer 45 is fitted onto the support pin 44 on the left of the roller 46 and is prevented from coming off by a retaining pin (not illustrated). Alternatively, the guide body 43 may not include the roller 46, the washer 45, and the like. That is, the guide body 43 may only include the support pin 44. Also, an attachment stay 41 is fixed to a left surface of an upper and rear portion of the fixed body 31 (first structure 31A). A position restrictor (stopper) 42 is attached to the attachment stay 41.

As illustrated in FIGS. 4 to 8, the movable body 32 is provided with the left manipulating lever 23L, the remote control valve 24, the armrest 26L, a detection switch 51, the operation lock lever 30, the tension spring 47, the switching mechanism 33, the guide plate 52, and the like. The movable body 32 is supported by the first support shaft 39 provided at the fixed body 31 so as to be rotatable about the axis thereof.

Figure 4:
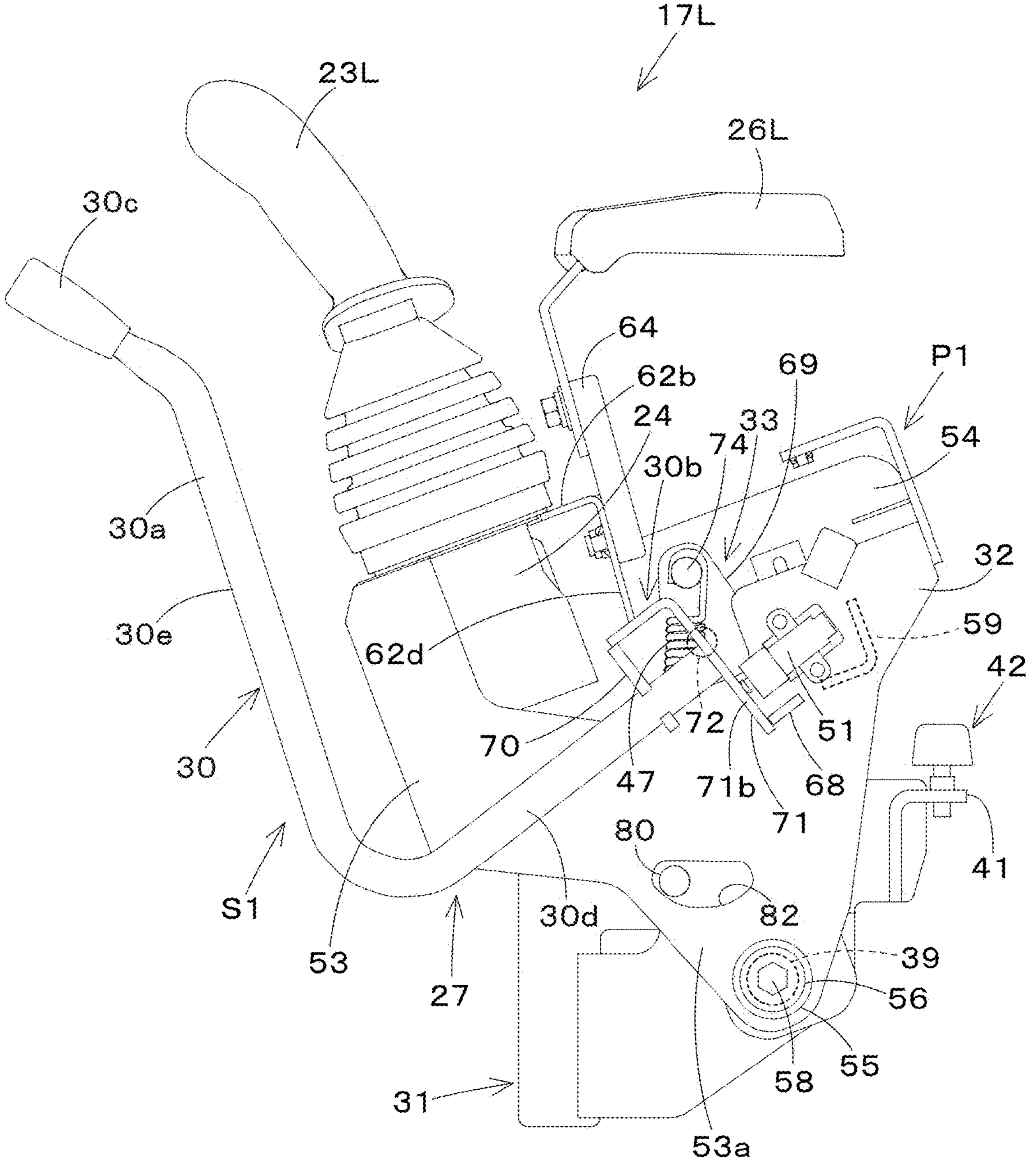
FIG. 4 is a side view of the manipulating device in a lowered position with a console cover removed.
Figure 5:
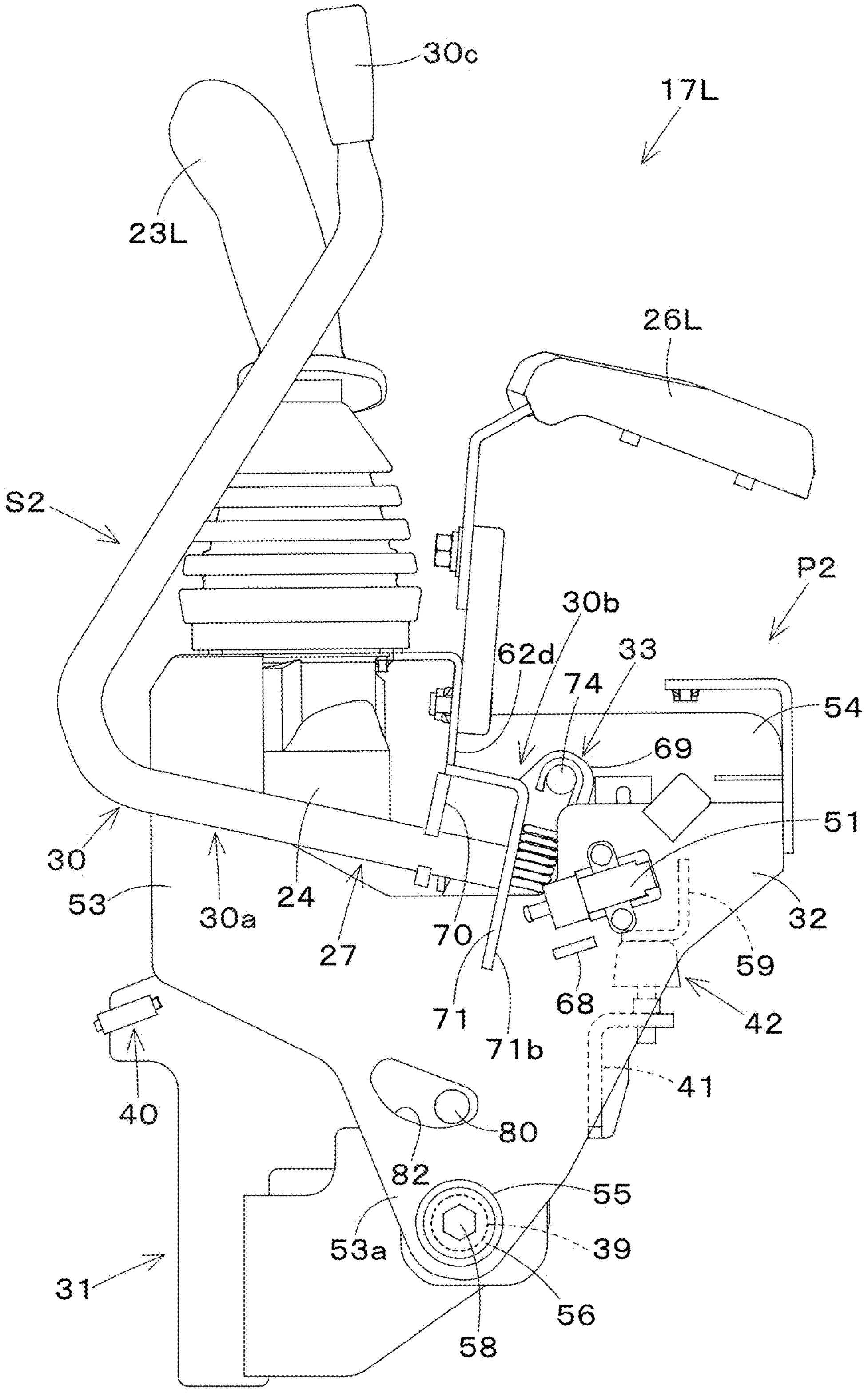
FIG. 5 is a side view of the manipulating device in a raised position with the console cover removed.
Figure 6:
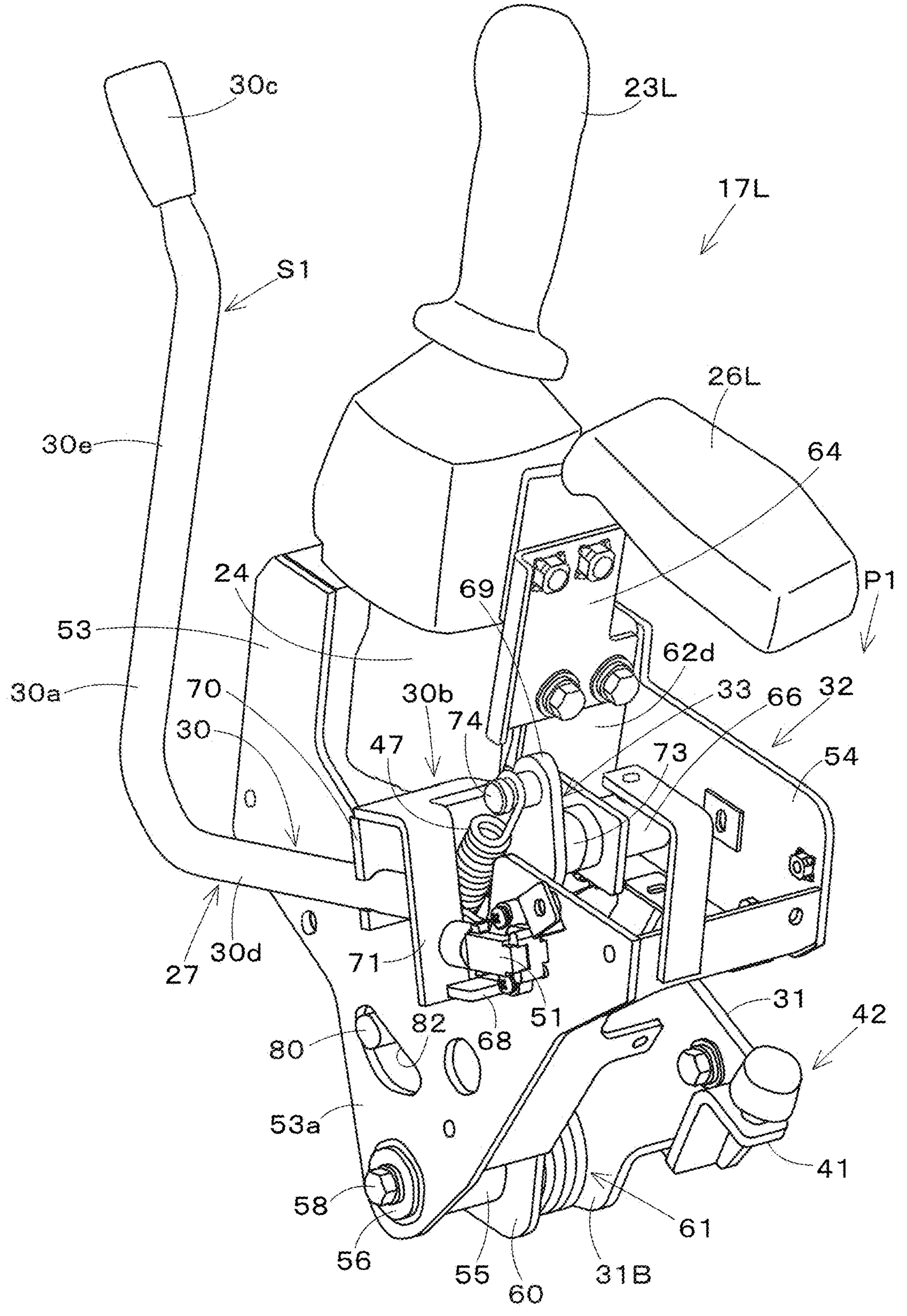
FIG. 6 is a perspective view of the manipulating device with the console cover removed.
Figure 7:
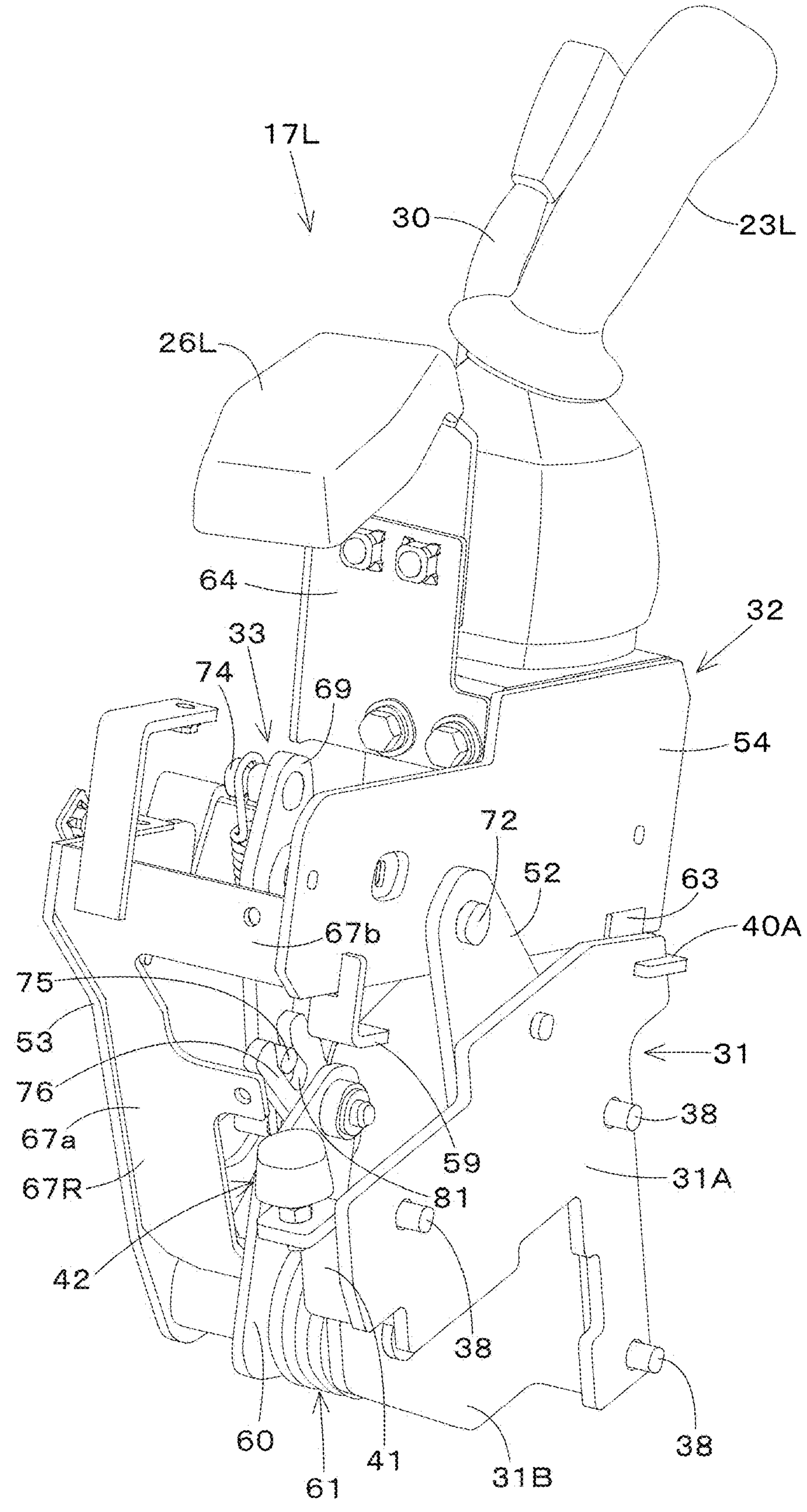
FIG. 7 is a perspective view of the manipulating device with the console cover removed.

The movable body 32 is rotatable (the position of the movable body 32 is changeable) between a lowered position P1 illustrated in FIG. 4 and a raised position P2 illustrated in FIG. 5, which is a position of the movable body 32 rotated upward from the lowered position P1 about the first support shaft 39. When the movable body 32 is operated to the raised position P2, for example, the working device 4 (the boom cylinder C2, the arm cylinder C3, the bucket cylinder C4) and the machine body 2 (turning motor) are inoperable, and when the movable body 32 is operated to the lowered position P1, the working device 4 is operable and the machine body 2 is operable to turn.

In the raised position P2, all or main hydraulic actuators (the boom cylinder C2, the arm cylinder C3, the bucket cylinder C4, the swing cylinder, the dozer cylinder, the traveling motor M1, the turning motor, a hydraulic actuator detachably connected to a service port, and the like) of the working machine 1 may be inoperable, that is, supply with a hydraulic fluid may be stopped.

In the present example embodiment, since the belt winding structure 28 is located rearward of the left manipulating lever 23L, the rotation amount of the movable body 32 is limited by the belt winding structure 28 when the movable body 32 is rotated rearward from the lowered position P1. That is, the rotation angle of the movable body 32 from the lowered position P1 to the raised position P2 about the first support shaft 39 cannot be made large. In the present example embodiment, the rotation angle is 20°, for example. The rotation angle is not limited to this. For example, the rotation angle can be set to 15° to 25°, for example.

The operation lock lever 30 is operable to a pushed-down position S1 illustrated in FIG. 4 and a pulled-up position S2 illustrated in FIG. 5. The pushed-down position S1 corresponds to the lowered position P1, and the pulled-up position S2 corresponds to the raised position P2.

In the following description, a direction in which the movable body 32 rotates upward from the lowered position P1 is referred to as a raising direction, and a direction in which the movable body 32 rotates downward from the raised position P2 is referred to as a lowering direction. Also, a direction in which the operation lock lever 30 rotates upward from the pushed-down position S1 is referred to as a pull-up direction, and a direction in which the operation lock lever 30 rotates downward from the pulled-up position S2 is referred to as a push-down direction.

Figure 10:
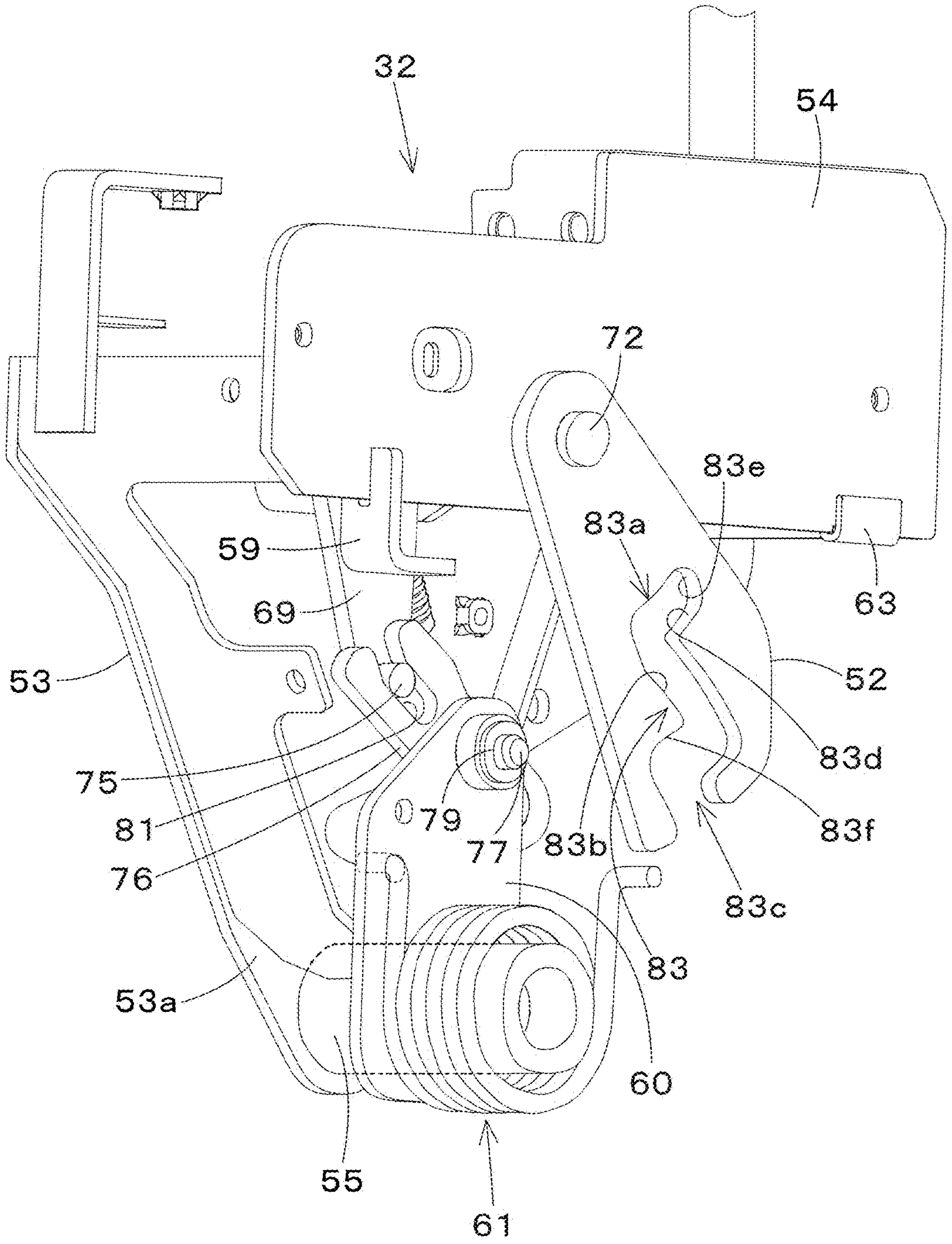
Figure 11:
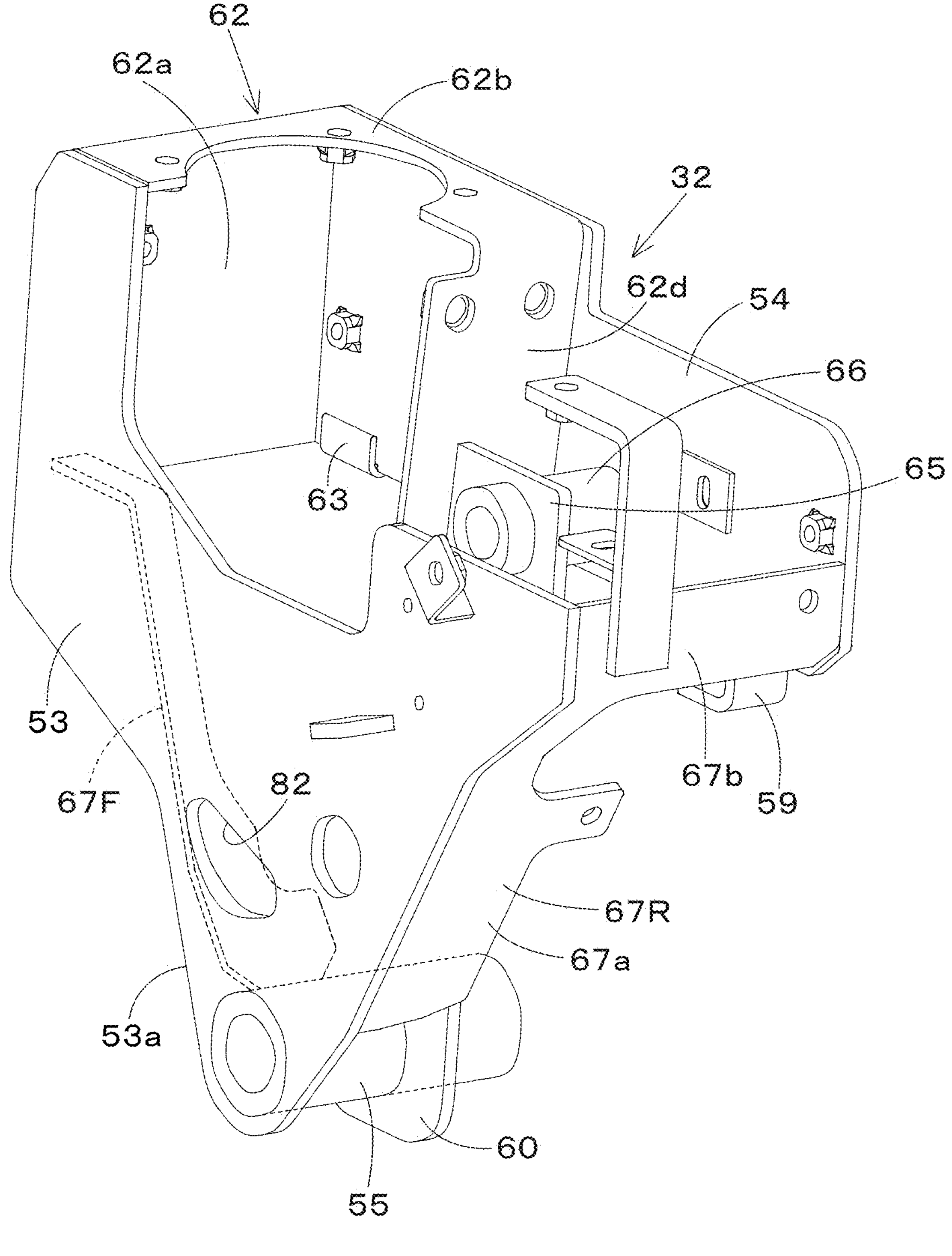
FIG. 11 is a perspective view of the movable body.

As illustrated in FIGS. 10 and 11, the movable body 32 includes a first wall portion 53 that is a left wall portion and a second wall portion 54 that is a right wall portion. The first wall portion 53 and the second wall portion 54 are provided with a space therebetween in the machine-body width direction. The movable body 32 includes a supported portion 55 supported by the first support shaft 39 so as to be rotatable about the axis thereof. The supported portion 55 includes a tube having an axis extending in the machine-body width direction, and is fixed to a lower portion of the first wall portion 53. Specifically, a lower section 53*a* that is the lower portion of the first wall portion 53 is narrower in the front-rear direction as extending downward, and the supported portion 55 is fixed to a lower portion of the lower section 53*a*. Also, a left end portion of the supported portion 55 penetrates through the first wall portion 53 and is fixed thereto. Thus, the supported portion 55 protrudes rightward from the first wall portion 53 (the lower portion of the lower section 53*a*).

As illustrated in FIG. 9, the supported portion 55 is fitted onto the first support shaft 39 from the left so as to be rotatable about the axis thereof. Also, the supported portion 55 is prevented from coming off from the first support shaft 39 by a bolt 58 screwed into a washer 56 and a screw hole 57 in the first support shaft 39. Accordingly, the movable body 32 is supported by the fixed body 31 (first support shaft 39) so as to be rotatable about an axis extending in the machine-body width direction.

As illustrated in FIGS. 10 and 11, a contact 63 made of an elastic material is fixed to a front portion of a lower end portion of the second wall portion 54. The contact 63 is in contact with the receiver 40 of the fixed body 31 when the movable body 32 is in the lowered position P1 (see FIG. 8). Accordingly, the rotation of the movable body 32 in the lowering direction is restricted. A contact plate 59 is fixed to a rear and lower portion of the second wall portion 54. As illustrated in FIG. 5, the contact plate 59 is in contact with the position restrictor 42 of the fixed body 31 when the movable body 32 is in the raised position P2. Accordingly, the rotation of the movable body 32 in the raising direction is restricted.

Figure 8:
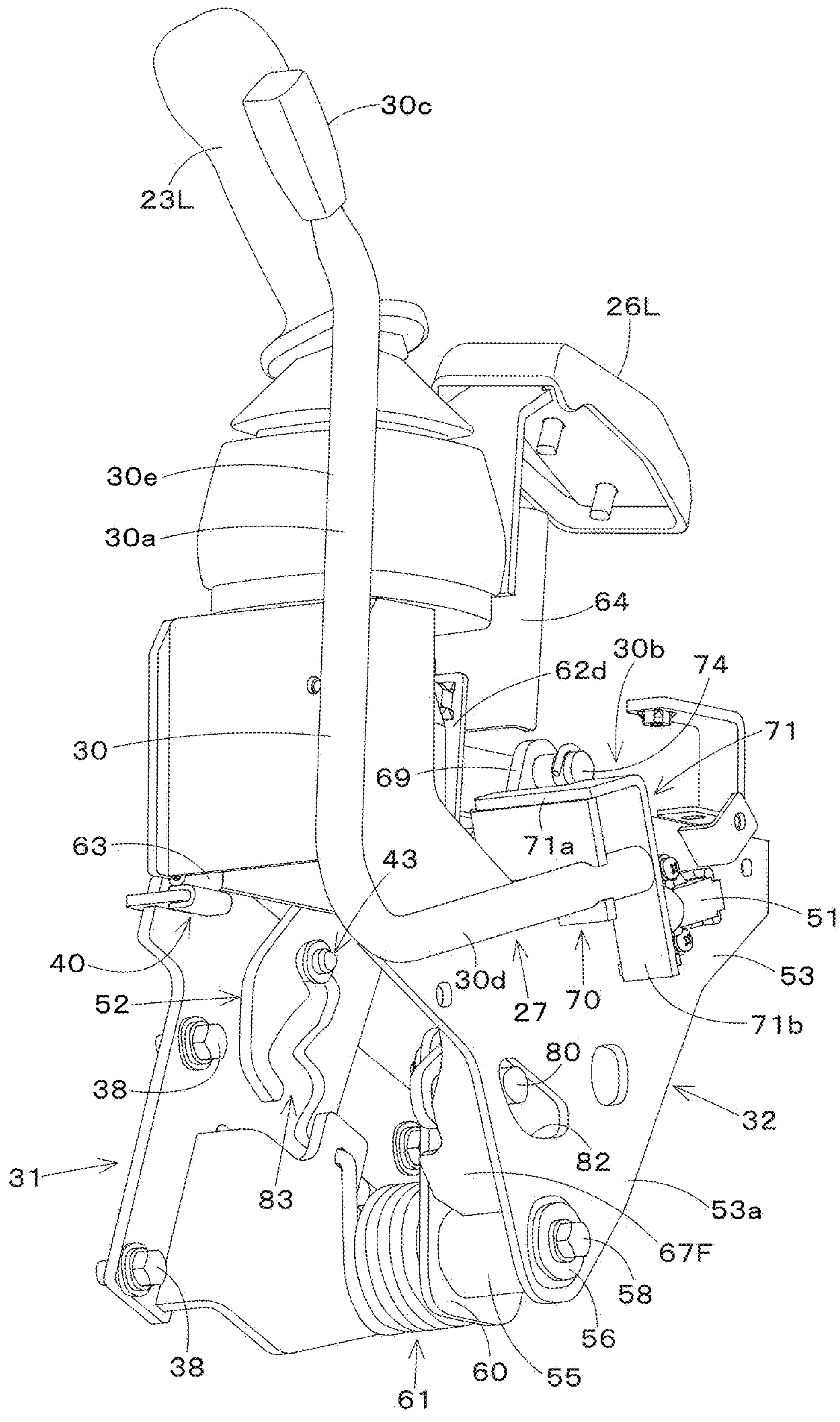
FIG. 8 is a perspective view of the manipulating device with the console cover removed.

As illustrated in FIG. 10, a support plate 60 is fixed to a middle portion in the machine-body width direction of the supported portion 55. The support plate 60 is provided so that plate surfaces thereof face in the machine-body width direction, and the supported portion 55 penetrates through and is fixed to a lower portion of the support plate 60. An assist spring 61 is provided rightward of the support plate 60, on the supported portion 55. That is, the assist spring 61 is provided between the support plate 60 and the second structure 31B of the fixed body 31 (see FIG. 6). The assist spring 61 includes a torsion coil spring having an axis extending in the machine-body width direction, and is provided so that the supported portion 55 is inserted through the assist spring 61. In other words, the assist spring 61 is loosely fitted onto the supported portion 55. One end of the assist spring 61 is retained at the support plate 60. As illustrated in FIG. 8, another end of the assist spring 61 is retained at the second structure 31B (fixed body 31). The biasing force of the assist spring 61 acts in a direction in which the movable body 32 is rotated in the raising direction. The assist spring 61 assists the upward rotation operation of the movable body 32.

As illustrated in FIG. 11, the movable body 32 includes an attachment bracket 62 provided between a front and upper portion of the first wall portion 53 and a front portion of the second wall portion 54. The attachment bracket 62 includes a front wall 62*a*, an upper wall 62*b*, and a rear wall 62*d*. The front wall 62*a* couples front end portions of the first wall portion 53 and the second wall portion 54 to each other. A front portion of the upper wall 62*b* couples upper end portions of the first wall portion 53 and the second wall portion 54 to each other. A right portion of the upper wall 62*b* extends rearward. Also, the upper wall 62*b* defines a valve attachment portion to which the remote control valve 24 is attached (see FIG. 4). The rear wall 62*d* extends downward from a rear end of the right portion of the upper wall 62*b*. Also, the rear wall 62*d* is narrower than the distance between the first wall portion 53 and the second wall portion 54, and is provided closer to the second wall portion 54 and fixed to the second wall portion 54. An attachment stay 64 to attach the armrest 26L is attached to an upper portion of the rear wall 62*d* (see FIG. 4).

As illustrated in FIG. 11, a support stay 65 is fixed to a lower portion of the rear wall 62*d*. Specifically, the support stay 65 is provided rearward of the lower portion of the rear wall 62*d* so that plate surfaces thereof face in the machine-body width direction, and is fixed to a rear surface of the rear wall 62*d*. A support tube 66 is provided between the support stay 65 and the second wall portion 54. Specifically, a left portion of the support tube 66 penetrates through the support stay 65, protrudes leftward from the support stay 65, and is fixed to the support stay 65. A right end portion of the support tube 66 penetrates through the second wall portion 54 and is fixed to the second wall portion 54.

As illustrated in FIGS. 10 and 11, the movable body 32 is provided with a pair of front and rear reinforcing plates 67F and 67R. A lower end of the front reinforcing plate 67F is fixed to a front upper portion of the supported portion 55, and the front reinforcing plate 67F extends obliquely forward and upward from the supported portion 55 along a right surface of the first wall portion 53 and extends forward at an upper portion thereof. The front reinforcing plate 67F is fixed to the right surface of the first wall portion 53 and the front wall 62*a* of the attachment bracket 62. A lower end of the rear reinforcing plate 67R is fixed to a rear upper portion of the supported portion 55. The rear reinforcing plate 67R has a first section 67*a* that extends obliquely rearward and upward from the supported portion 55 along the right surface of the first wall portion 53, and a second section 67*b* that couples rear portions of the first wall portion 53 and the second wall portion 54. The first section 67*a* is fixed to the right surface of the first wall portion 53 and is connected to a left portion of the second section 67*b*.

As illustrated in FIG. 4, the detection switch 51 is attached to a rear portion of a left surface of the first wall portion 53 (movable body 32). A contact plate 68 is provided below a front portion of the detection switch 51 and is fixed to the left surface of the first wall portion 53. Also, a reinforcing portion 71 of the lever proximal portion 30*b* of the operation lock lever 30 is provided leftward of the first wall portion 53 and forward of the detection switch 51.

Figure 12:
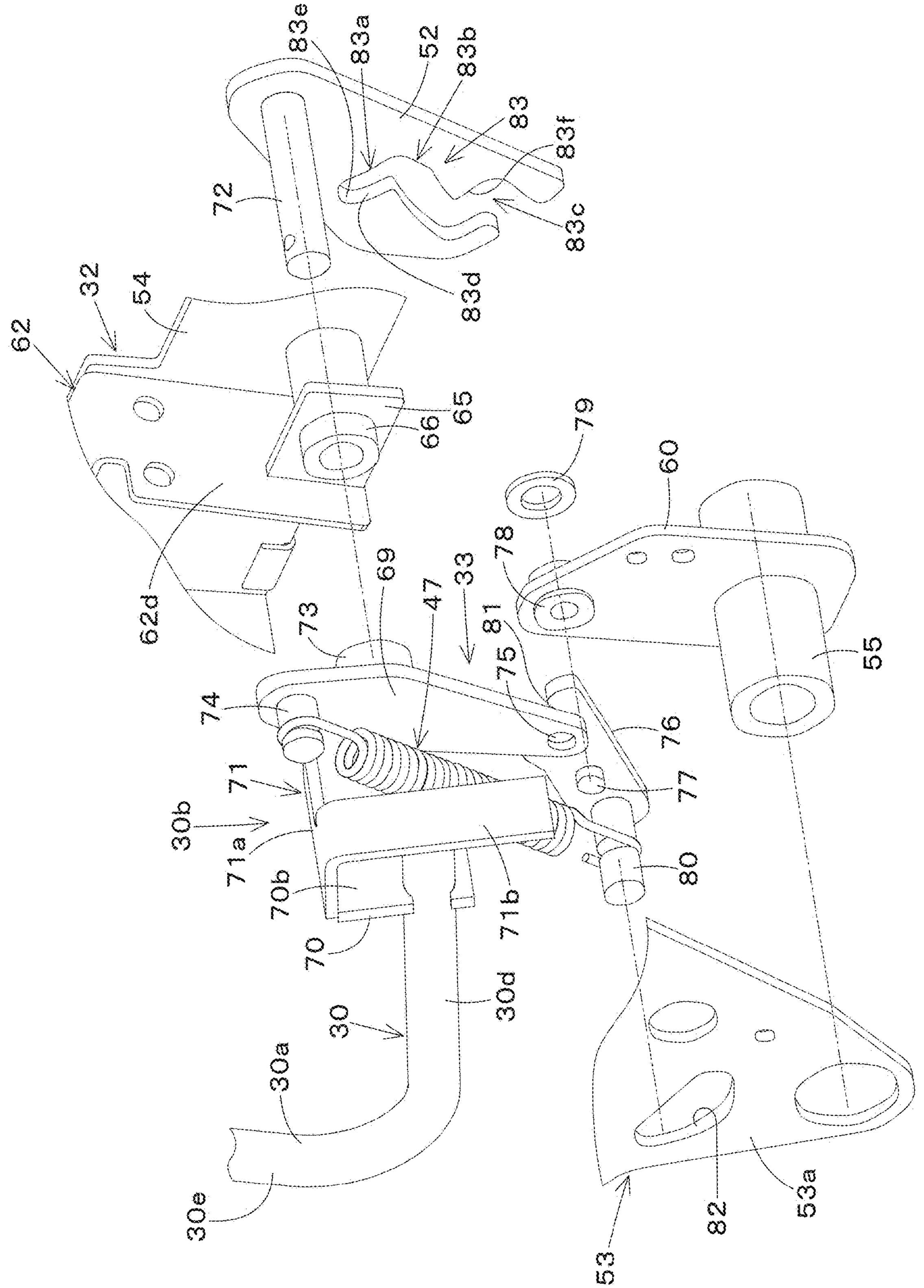
FIG. 12 is an exploded perspective view of the switching mechanism and its surroundings.
Figure 13:
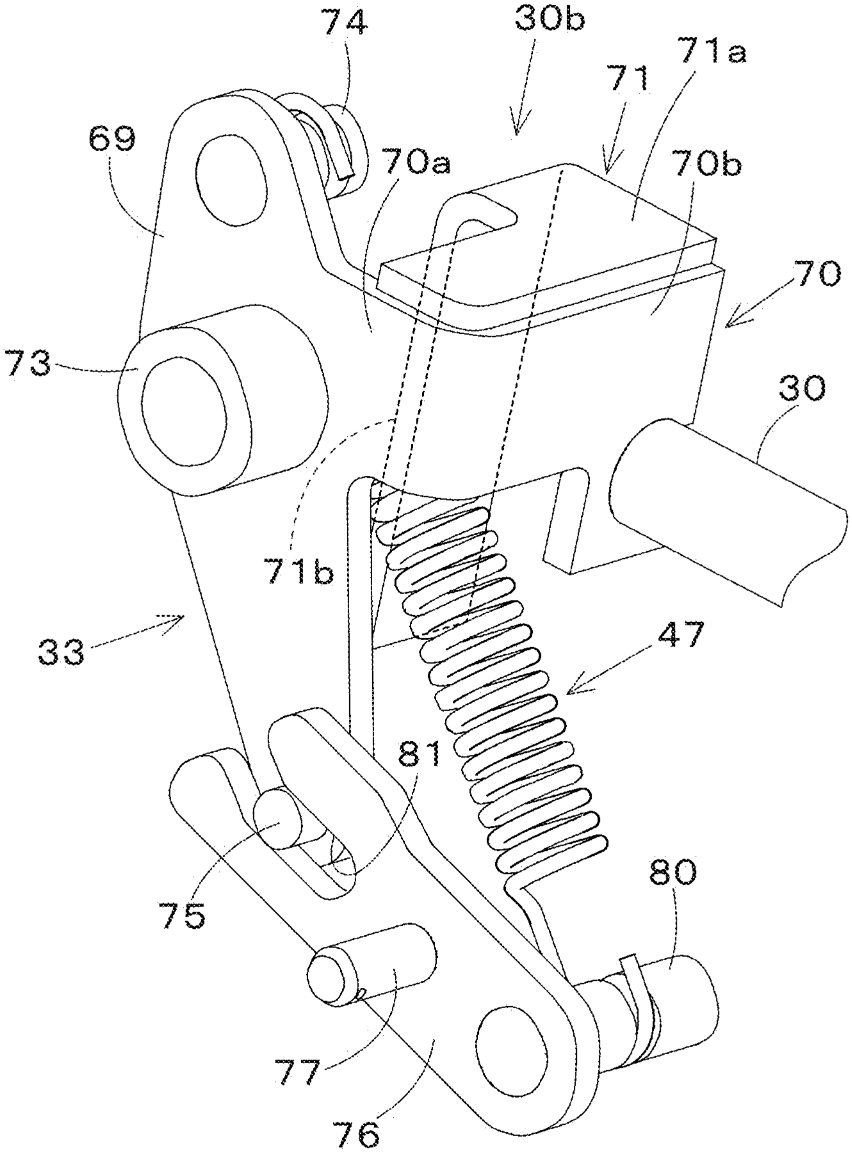
FIG. 13 is a perspective view of the switching mechanism.

As illustrated in FIGS. 12 and 13, the lever proximal portion 30*b* includes a rotational body 69, a coupling portion 70, and the reinforcing portion 71. The rotational body 69 includes a plate material including plate surfaces facing in the machine-body width direction and including a vertically long shape that is long in the up-down direction. The rotational body 69 is rotatably supported by the movable body 32 via a support shaft (second support shaft) 72. Specifically, as illustrated in FIG. 13, a support boss 73 including a tube is fixed to a middle portion in the longitudinal direction of a right surface of the rotational body 69. The support boss 73 has an axis extending in the machine-body width direction and is provided at the middle portion in the longitudinal direction of the rotational body 69. Specifically, the support boss 73 is provided at a position higher than a central portion in the longitudinal direction of the rotational body 69. As illustrated in FIG. 12, the second support shaft 72 is inserted through the support tube 66 of the movable body 32 from the right, and is supported by the support tube 66 so as to be rotatable about an axis thereof. A left portion of the second support shaft 72 protrudes leftward from the support tube 66, and the support boss 73 is fitted onto the portion of the second support shaft 72 protruding leftward from the support tube 66 and fixed by a pin, a screw, or the like. Thus, the rotational body 69 is supported by the support tube 66 so as to be rotatable about the axis extending in the machine-body width direction together with the second support shaft 72. In other words, the lever proximal portion 30*b* (operation lock lever 30) is supported by the movable body 32 so as to be rotatable about an axis extending in the machine-body width direction together with the second support shaft 72.

As illustrated in FIGS. 12 and 13, the coupling portion 70 couples the rotational body 69 and a proximal portion of the lever main body 30*a* (a rear portion of the lower section 30*d*). The coupling portion 70 includes a first section 70*a* integrally extending forward from the rotational body 69 and a second section 70*b* extending leftward from a front end of the first section 70*a*. The proximal portion of the lever main body 30*a* is fixed to a left portion of the second section 70*b*.

As illustrated in FIGS. 12 and 13, the reinforcing portion 71 includes a first section 71*a* fixed to an upper end of the coupling portion 70 and a second section 71*b* extending downward from a left portion of the first section 71*a*. The second section 71*b* of the reinforcing portion 71 is located rearward of the second section 70*b* of the coupling portion 70, and a rear end of the proximal portion of the lever main body 30*a* is fixed to the second section 71*b*. As illustrated in FIG. 4, a lower portion of the second section 71*b* of the reinforcing portion 71 is located forward of the detection switch 51 (see FIG. 4), and presses a contact of the detection switch 51 when the operation lock lever 30 is in the pushed-down position S1. The detection switch 51 is connected to a controller of a hydraulic circuit, and the controller brings a hydraulic fluid delivered from a hydraulic pump into a state of being able to be supplied to each hydraulic actuator in a state in which the contact of the detection switch 51 is pressed. The contact plate 68 restricts the second section 71*b* of the reinforcing portion 71 so as not to excessively press the contact of the detection switch 51. The lower portion of the second section 71*b* of the reinforcing portion 71 is separated from the contact of the detection switch 51 as the operation lock lever 30 is rotated in the pull-up direction, and the controller brings the hydraulic fluid delivered from the hydraulic pump into a state of not being able to be supplied to each hydraulic actuator in a state in which the detection switch 51 does not detect the reinforcing portion 71.

Figure 14:
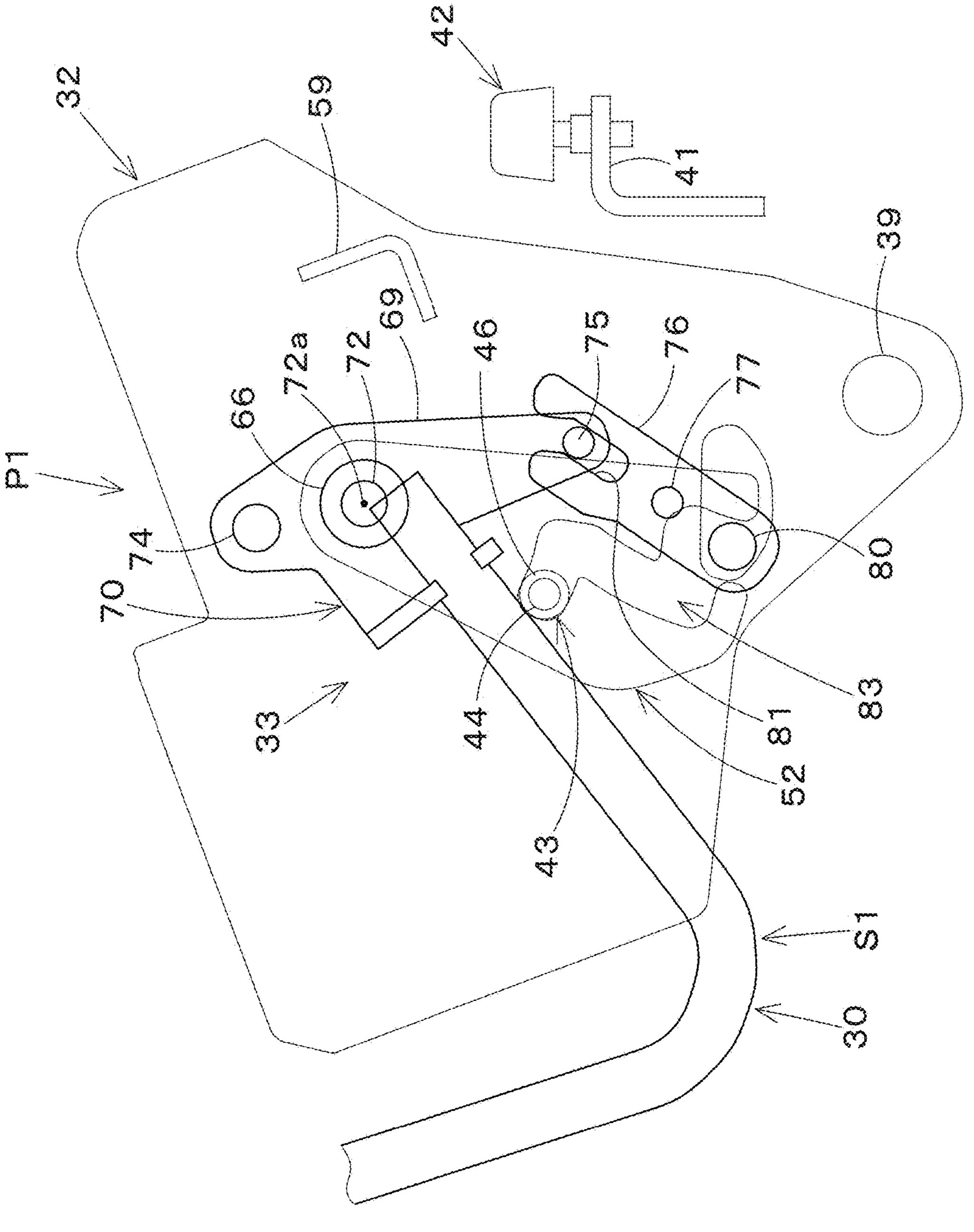
FIG. 14 is a schematic side view of the movable body in the lowered position, a lever, and the switching mechanism.
Figure 15:
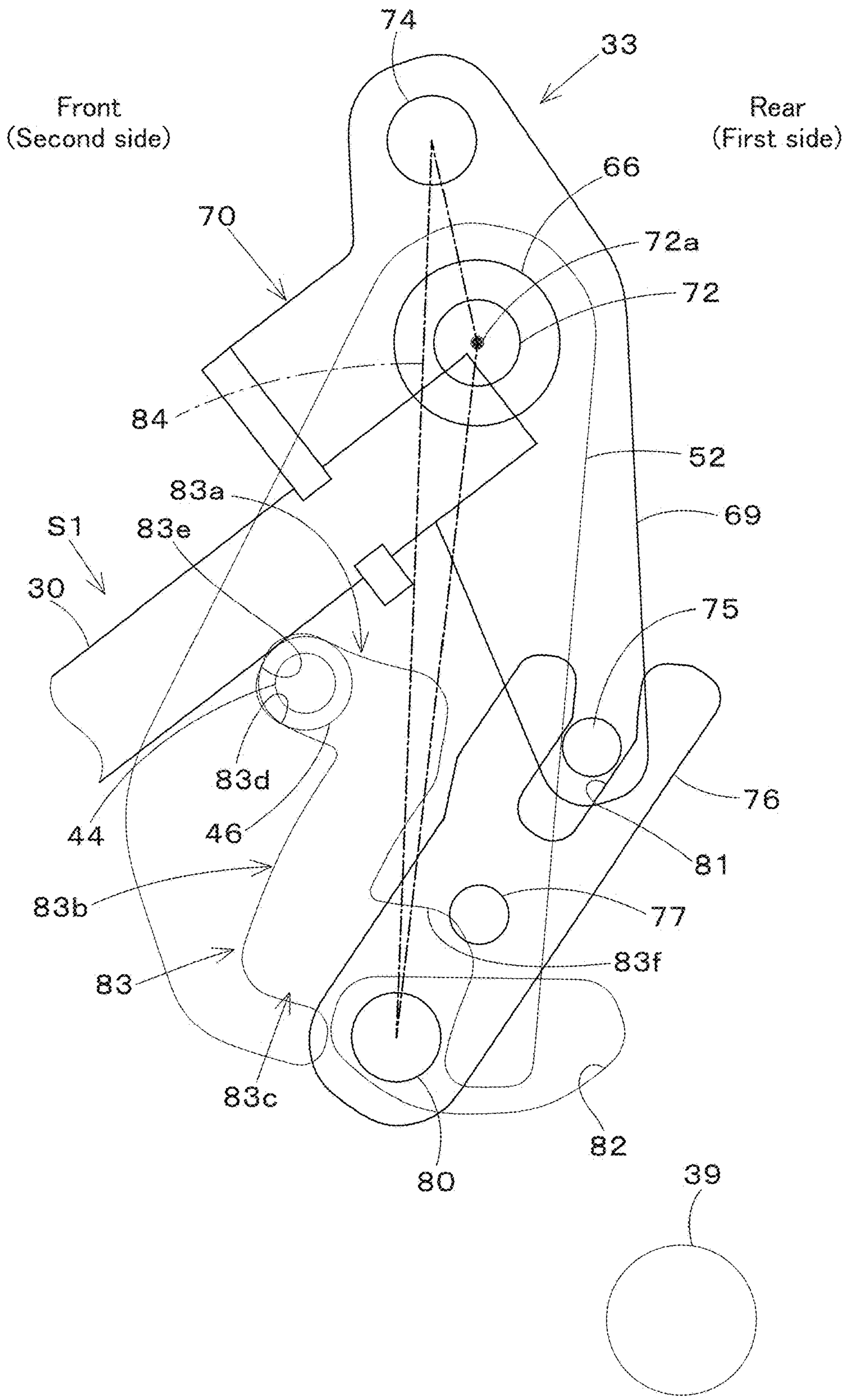
FIG. 15 is an enlarged view of the switching mechanism in FIG. 14.

As illustrated in FIGS. 12 and 13, the rotational body 69 is provided with a first spring hook portion 74 and a first engagement portion 75. The first spring hook portion 74 is fixedly provided at one end portion in the longitudinal direction (upper portion) of the rotational body 69, and the first engagement portion 75 is fixedly provided at another end portion in the longitudinal direction (lower portion) of the rotational body 69. Also, the second support shaft 72 is located at the middle portion in the longitudinal direction of the rotational body 69. Thus, as illustrated in FIGS. 14 and 15, the first spring hook portion 74 and the first engagement portion 75 are positioned such that the axis of the second support shaft 72 is located between the first spring hook portion 74 and the first engagement portion 75. As illustrated in FIG. 12, the first spring hook portion 74 includes a pin having an axis extending in the machine-body width direction, has a right portion fixed to the rotational body 69, and protrudes leftward from the rotational body 69. As illustrated in FIG. 13, the first engagement portion 75 includes a pin (parallel to the second support shaft 72 or a third support shaft 77) having an axis extending in the machine-body width direction, and protrudes rightward from the rotational body 69.

The tension spring 47 is a spring that biases the operation lock lever 30.

As illustrated in FIGS. 12, 13, and 14, the switching mechanism 33 includes the above-described rotational body 69, and further includes a link 76. In the present example embodiment, the rotational body 69 defining a portion of the switching mechanism 33 is common to the rotational body 69 defining the lever proximal portion 30*b*, but this does not imply any limitation. The rotational body 69 defining the switching mechanism 33 may be a body different from the rotational body 69 defining the lever proximal portion 30*b*. Even in this case, the rotational body 69 defining the switching mechanism 33 is provided so as to rotate together with the operation lock lever 30 about the second support shaft 72.

The switching mechanism 33 switches the direction of the biasing force of the tension spring 47 between a direction in which the operation lock lever 30 is pulled down and a direction in which the operation lock lever 30 is pulled up in accordance with the rotation operation of the operation lock lever 30. Specifically, the switching mechanism 33 switches the direction of the biasing force of the tension spring 47 to change between when the operation lock lever 30 is in the pushed-down position S1 and when the operation lock lever 30 is in the pulled-up position S2 such that the biasing force of the tension spring 47 acts in the direction in which the operation lock lever 30 is pulled down when the operation lock lever 30 is in the pushed-down position S1 and acts in the direction in which the operation lock lever 30 is pulled up when the operation lock lever 30 is in the pulled-up position S2.

As illustrated in FIGS. 12, 13, and 14, the link 76 is provided rightward of a lower portion of the rotational body 69, and is rotatably supported by the movable body 32 via the support shaft (third support shaft) 77. Specifically, the third support shaft 77 includes a rod having an axis extending in the machine-body width direction, and is fixed to a middle portion in the longitudinal direction of the link 76 so as to protrude rightward. The link 76 is provided leftward of the support plate 60 of the movable body 32. A tubular boss portion 78 having an axis extending in the machine-body width direction is provided at an upper portion of the support plate 60. The third support shaft 77 is inserted through the boss portion 78 of the support plate 60 so as to be rotatable about the axis extending in the machine-body width direction, and is prevented from coming off by a washer 79 and a retaining pin.

As illustrated in FIGS. 12, 13, and 14, the link 76 includes a second spring hook portion 80 and a second engagement portion 81. The second spring hook portion 80 is fixedly provided at one end portion in the longitudinal direction (lower portion) of the link 76, and the second engagement portion 81 is fixedly provided at another end portion in the longitudinal direction (upper portion) of the link 76. Also, the third support shaft 77 is fixed to the middle portion in the longitudinal direction of the link 76. Thus, as illustrated in FIGS. 14 and 15, the second spring hook portion 80 and the second engagement portion 81 are positioned such that the axis of the third support shaft 77 is located between the second spring hook portion 80 and the second engagement portion 81.

The second spring hook portion 80 includes a pin having an axis extending in the machine-body width direction, includes a right portion fixed to the link 76, and protrudes leftward from the link 76.

As illustrated in FIGS. 13 and 14, the second engagement portion 81 includes a groove that is elongated in the longitudinal direction of the link 76 and is open at an end portion of the link 76. The first engagement portion 75 (pin) can be inserted into the groove (81) from an open side of the groove (81). The first engagement portion 75 is movable in the longitudinal direction in the groove (81). Thus, the link 76 is provided so that the first engagement portion 75 and the second engagement portion 81 are engaged with each other. Specifically, the link 76 is provided to butt against the lever proximal portion 30*b* such that the second engagement portion 81 engages with the first engagement portion 75. Also, the link 76 rotates about the third support shaft 77 as the second engagement portion 81 moves as the first engagement portion 75 is moved by the rotation of the lever proximal portion 30*b* about the second support shaft 72.

In the present example embodiment, the first engagement portion 75 includes the pin parallel to the second support shaft 72 or the third support shaft 77, and the second engagement portion 81 includes the groove with one end open, but this does not imply any limitation. The first engagement portion 75 may include the groove, and the second engagement portion 81 may include the pin. Also, the second engagement portion 81 includes the groove open at the end portion of the link 76, but the second engagement portion 81 may include a hole (long hole) instead of the groove. The hole differs from the groove in the present example embodiment in that the open side of the groove is closed (the hole is defined by an annular edge). Also, when the second engagement portion 81 includes the pin, the first engagement portion 75 includes the groove or the hole (long hole).

As illustrated in FIG. 12, the tension spring 47 includes a tension coil spring. The tension spring 47 is provided between the rotational body 69 and the second section 71*b* of the reinforcing portion 71 and inward (rightward) of the first wall portion 53 of the movable body 32. The tension spring 47 is extended between the first spring hook portion 74 and the second spring hook portion 80. Specifically, one end of the tension spring 47 is hooked on and retained at the first spring hook portion 74. Another end of the tension spring 47 is hooked on and retained at the second spring hook portion 80.

As illustrated in FIG. 12, an insertion hole 82 through which a left end portion of the second spring hook portion 80 is inserted is provided in the lower portion of the first wall portion 53 of the movable body 32. A lower edge of the insertion hole 82 is in a substantially arc shape centered on the third support shaft 77, and an upper edge of the insertion hole 82 is in a substantially straight line shape. Since the biasing force of the tension spring 47 acts on the second spring hook portion 80 in the direction in which the second spring hook portion 80 is pulled up upward, the upper edge of the insertion hole 82 is in the straight line shape to provide a gap between the upper edge and the second spring hook portion 80 so that the second spring hook portion 80 is not pressed against the upper edge of the insertion hole 82.

The insertion hole 82 has a role of fixing the link 76 (second spring hook portion 80) so that the link 76 does not revolve when the tension spring 47 is assembled.

A procedure of assembling the tension spring 47 is described now. First, the link 76 is attached to the movable body 32 so as to revolve about the third support shaft 77. Next, the operation lock lever 30 is attached to the movable body 32. Next, the movable body 32 is assembled to the fixed body 31 together with the assist spring 61, and the other end of the assist spring 61 is first retained at the fixed body 31. Next, the one end of the assist spring 61 is retained at the support plate 60 at the position of the free angle of the torsion coil spring. Next, the tension spring 47 is hooked on the first spring hook portion 74 and the second spring hook portion 80 while being extended. At this time, when the link 76 is not restricted in the revolution direction and the link 76 is free to revolve, the link 76 revolves, therefore the distance between the first spring hook portion 74 and the second spring hook portion 80 becomes smaller than the free length of the tension spring 47, and the tension spring 47 comes off. In the present example embodiment, when the tension spring 47 is hooked on the first spring hook portion 74 and the second spring hook portion 80, the second spring hook portion 80 has been inserted through the insertion hole 82, the second spring hook portion 80 is retained at (is in contact with) a rear end of the insertion hole 82, and therefore the link 76 is fixed so as not to revolve. Accordingly, when the tension spring 47 is assembled, it is not necessary for a worker to fix the link 76, and therefore the tension spring 47 can be easily assembled.

The groove, which is the second engagement portion 81 provided in the link 76, is open upward, and the pin, which is the first engagement portion 75, can be inserted from the open side. Accordingly, the lever proximal portion 30*b* (rotational body 69) can be easily assembled from above in a state in which the link 76 is assembled.

As illustrated in FIG. 12, the guide plate 52 is fixed to the second support shaft 72. Specifically, the guide plate 52 is provided rightward of the second wall portion 54 of the movable body 32 and leftward of the fixed body 31, and an upper portion of the guide plate 52 is fixed to a right end of the second support shaft 72. The operation lock lever 30 is attached to the second support shaft 72 at the left (one of opposite ends) in the axial direction of the support tube 66, and the guide plate 52 is fixed to the second support shaft 72 at the right (the other of the opposite ends) in the axial direction of the support tube 66. Thus, the guide plate 52 rotates together with the operation lock lever 30 about an axis extending in the machine-body width direction.

The lever proximal portion 30*b* is provided in the movable body 32, the second support shaft 72 is inserted through the support tube 66 and the support boss 73 in a state in which the guide plate 52 is fixed to the right end of the second support shaft 72, and then the support boss 73 is attached to the left portion of the second support shaft 72. Accordingly, the lever proximal portion 30*b* and the guide plate 52 can be easily assembled to the movable body 32.

As illustrated in FIG. 9, a guide groove 83 that is guided by the guide body 43 of the fixed body 31 is provided in a lower portion of the guide plate 52. The roller 46 of the guide body 43 is inserted into the guide groove 83. The roller 46 is relatively movable in the guide groove 83 and rotatable in the guide groove 83.

FIGS. 14 and 15 illustrate a state in which the movable body 32 is in the lowered position P1, and in this state, the guide groove 83 is located below the second support shaft 72. The guide groove 83 has a first groove portion 83*a* in an upper portion, a second groove portion 83*b* in an intermediate portion, and a third groove portion 83*c* in a lower portion. The guide groove 83 (the first groove portion 83*a*, the second groove portion 83*b*, and the third groove portion 83*c*) is continuous. Specifically, a rear portion of the first groove portion 83*a* communicates with an upper portion of the second groove portion 83*b*, and a lower portion of the second groove portion 83*b* communicates with a front portion of the third groove portion 83*c*. The first groove portion 83*a* is in an arc shape centered on an axis 72*a* of the second support shaft 72 so as to extend in the front-rear direction. The roller 46 can relatively move about the second support shaft 72 in the first groove portion 83*a*. The second groove portion 83*b* is extends obliquely forward and downward from the rear portion of the first groove portion 83*a*. The roller 46 can relatively move about the first support shaft in the second groove portion 83*b*. Also, in the upper portion of the second groove portion 83*b*, the roller 46 can relatively move about the second support shaft 72 in the second groove portion 83*b*. The third groove portion 83*c* extends rearward from the lower portion of the second groove portion 83*b*. The roller 46 can relatively move about the second support shaft 72 in the third groove portion. Also, the third groove portion 83*c* is open downward at a rear portion thereof. Accordingly, the roller 46 can be inserted into the guide groove 83 from an open side of the third groove portion 83*c*.

In a state in which the movable body 32 is in the lowered position P1 and the operation lock lever 30 is in the pushed-down position S1 illustrated in FIGS. 14 and 15, the roller 46 is located at a front end portion of the first groove portion 83*a*. In the state in which the roller 46 is located at the front end portion of the first groove portion 83*a*, a lower edge (first restrictor) 83*d* of the first groove portion 83*a* is in contact with the roller 46, and therefore upward rotation of the guide plate 52 about the first support shaft 39 is restricted. Accordingly, the movable body 32 is restricted from rotating in the raising direction about the first support shaft 39. Also, the operation lock lever 30 and the guide plate 52 can rotate in the direction in which the operation lock lever 30 is pulled up. That is, the first groove portion 83*a* restricts the movable body 32 in the lowered position P1 from rotating in the raising direction and allows the operation lock lever 30 to rotate in the direction in which the operation lock lever 30 is pulled up.

Also, in the state in which the operation lock lever 30 is in the pushed-down position S1, a front edge (second restrictor) 83*e* of the first groove portion 83*a* is in contact with the roller 46, and therefore the guide plate 52 is restricted from rotating rearward about the second support shaft 72. Accordingly, the operation lock lever 30 is restricted from rotating from the pushed-down position S1 in the push-down direction about the second support shaft 72.

Figure 16:
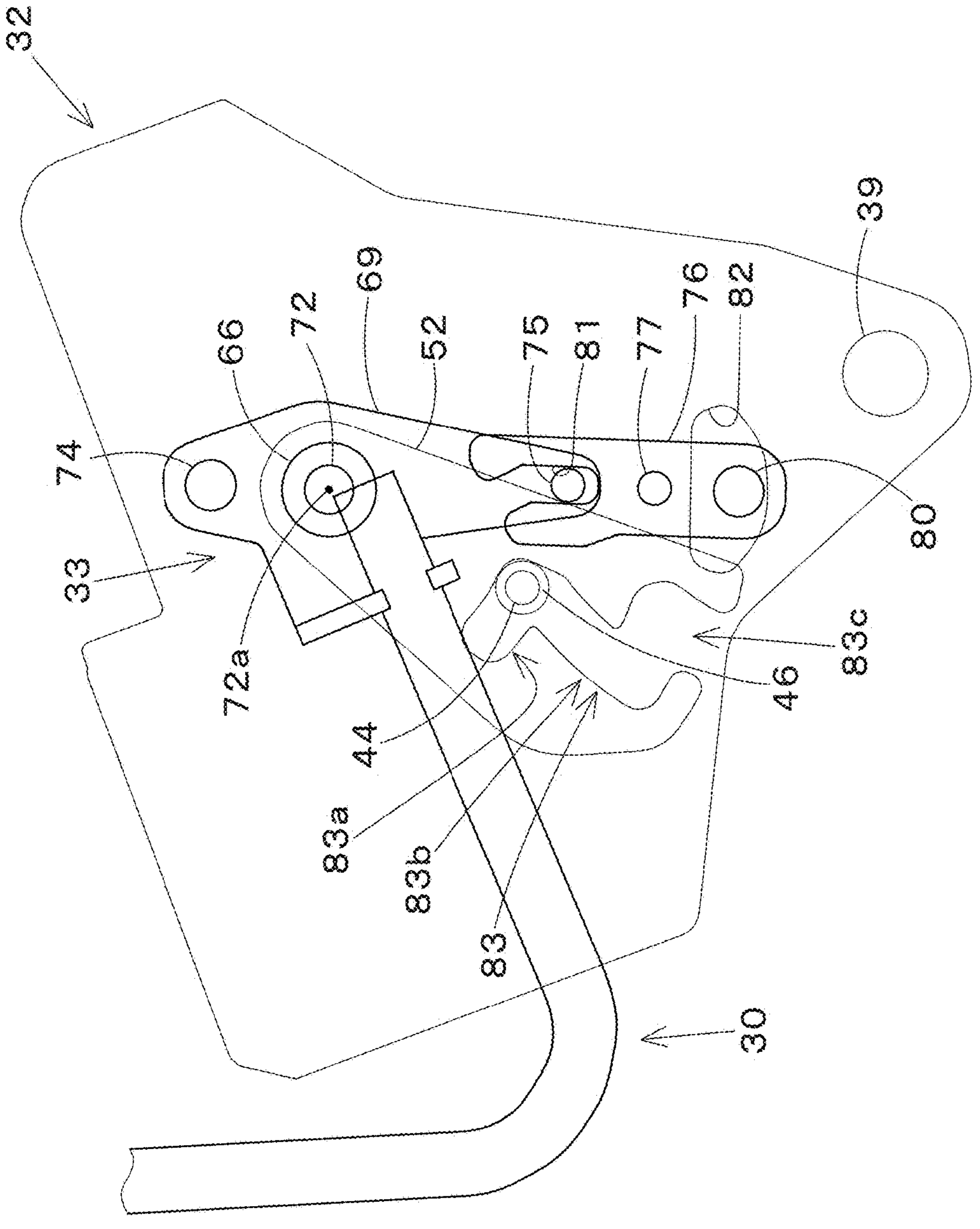
FIG. 16 is a schematic side view of the movable body in the middle of rotation, the lever, and the switching mechanism.
Figure 17:
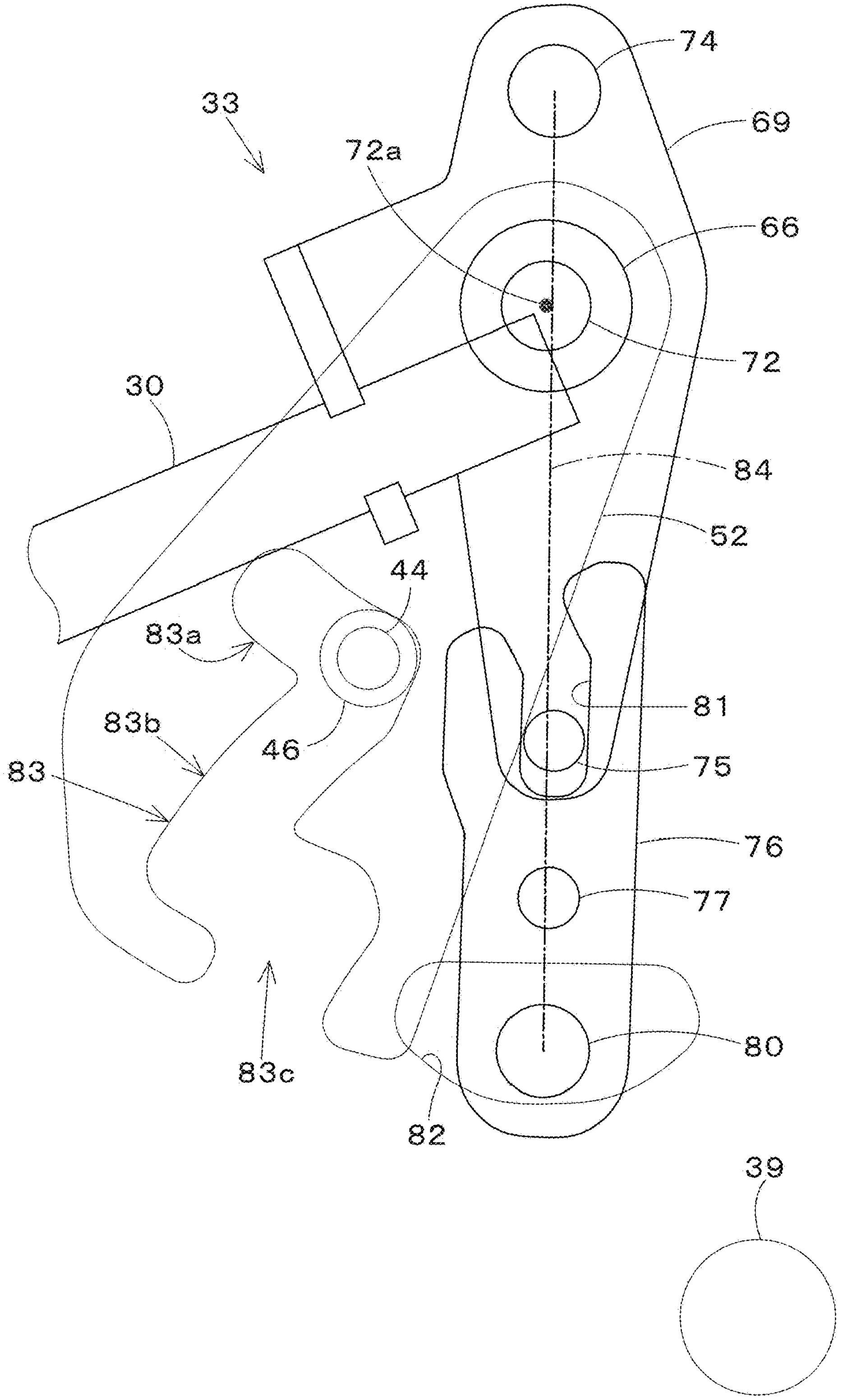
FIG. 17 is an enlarged view of the switching mechanism in FIG. 16.

In a state illustrated in FIGS. 16 and 17, in which the operation lock lever 30 has been pulled up from the pushed-down position S1 and the guide plate 52 has rotated about the second support shaft 72, the roller 46 is located at a rear end portion of the first groove portion 83*a*. When the roller 46 is located at the rear end portion of the first groove portion 83*a*, the roller 46 can relatively move in the second groove portion 83*b*, and the restriction of the upward rotation of the guide plate 52 about the first support shaft 39 by the contact of the first restrictor 83*d* with the roller 46 is released. That is, the second groove portion 83*b* allows the movable body 32 to rotate by the operation of the operation lock lever 30.

Figure 20:
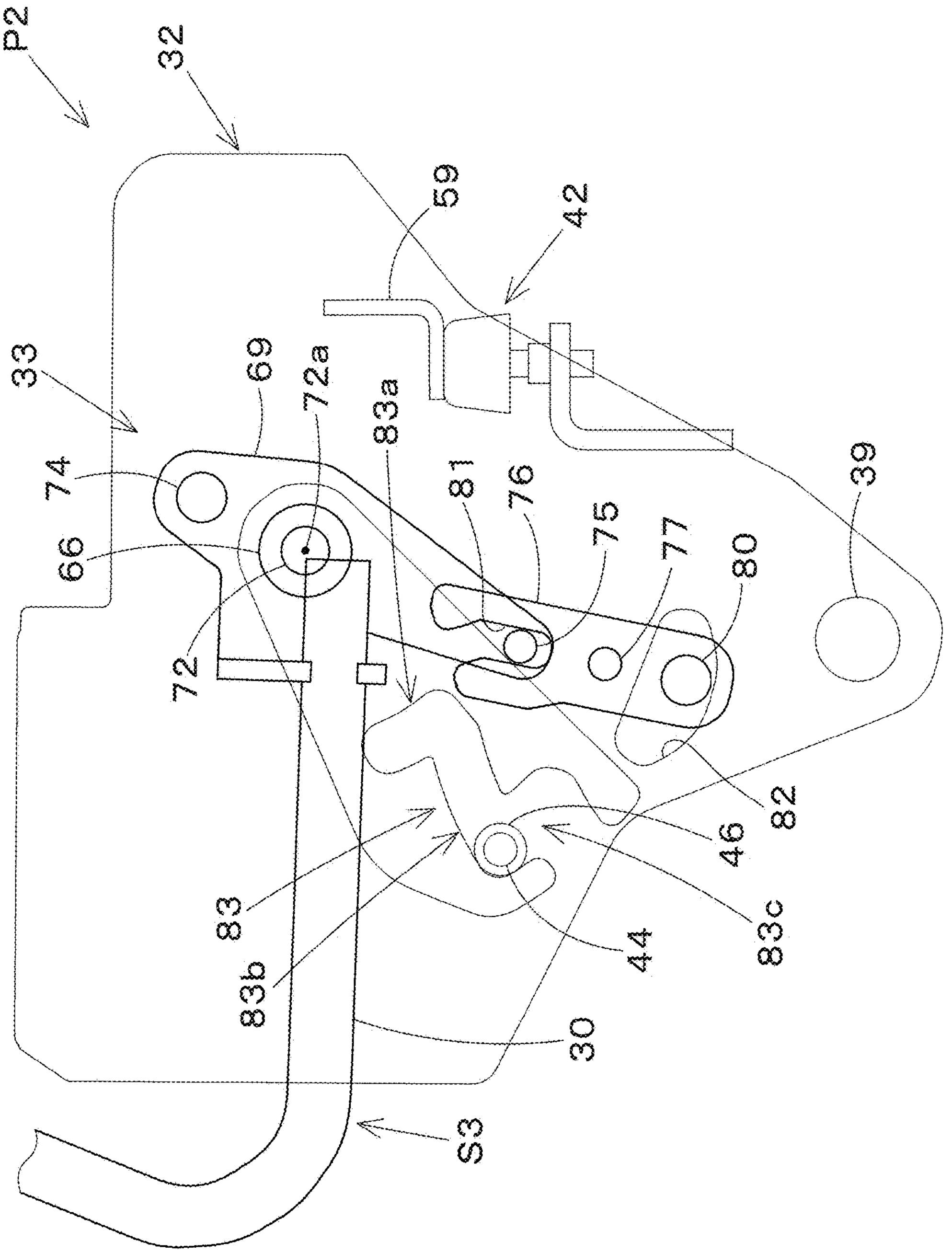
FIG. 20 is a schematic side view of the movable body in the raised position, the lever, and the switching mechanism.
Figure 21:
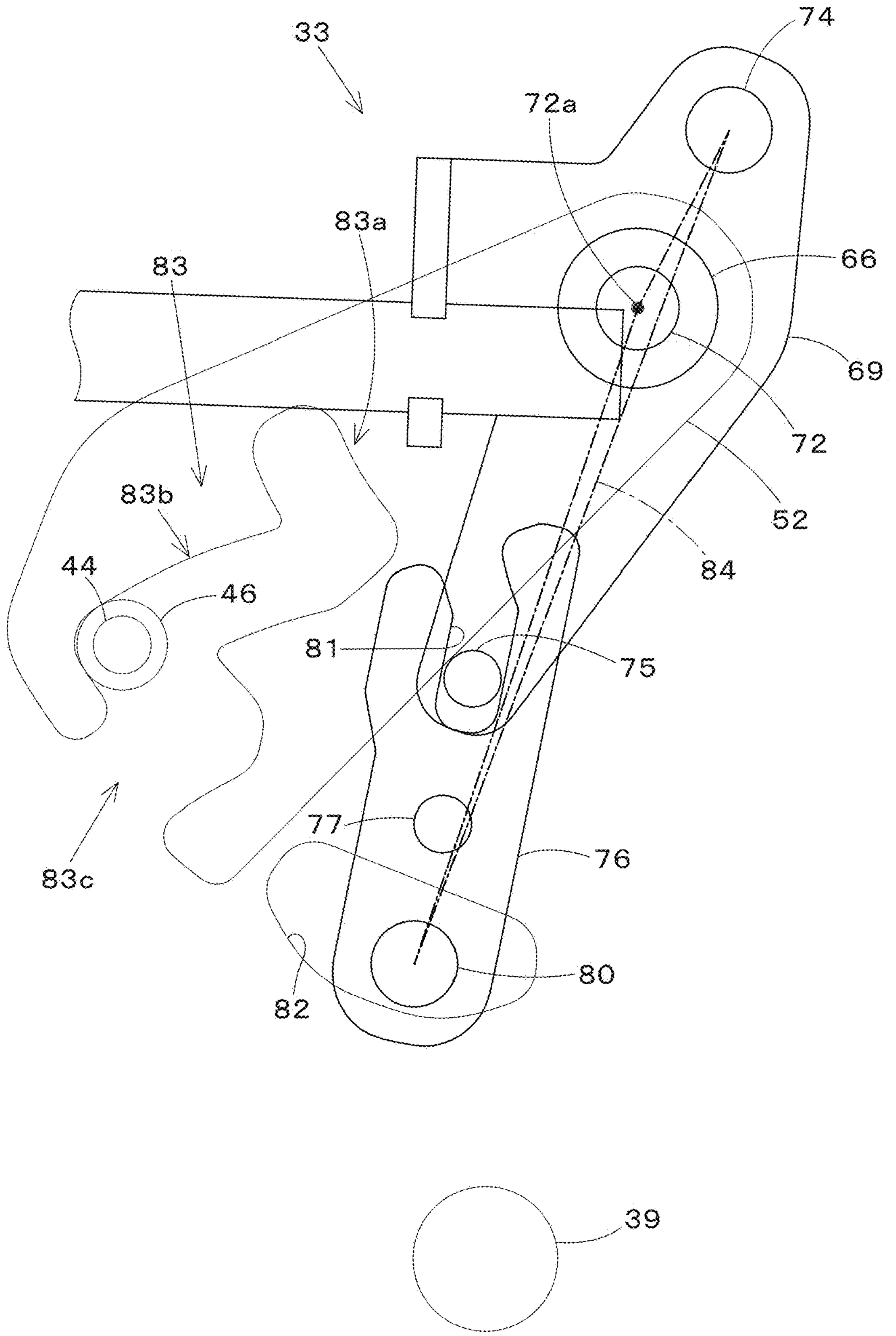
FIG. 21 is an enlarged view of the switching mechanism in FIG. 20.
Figure 22:
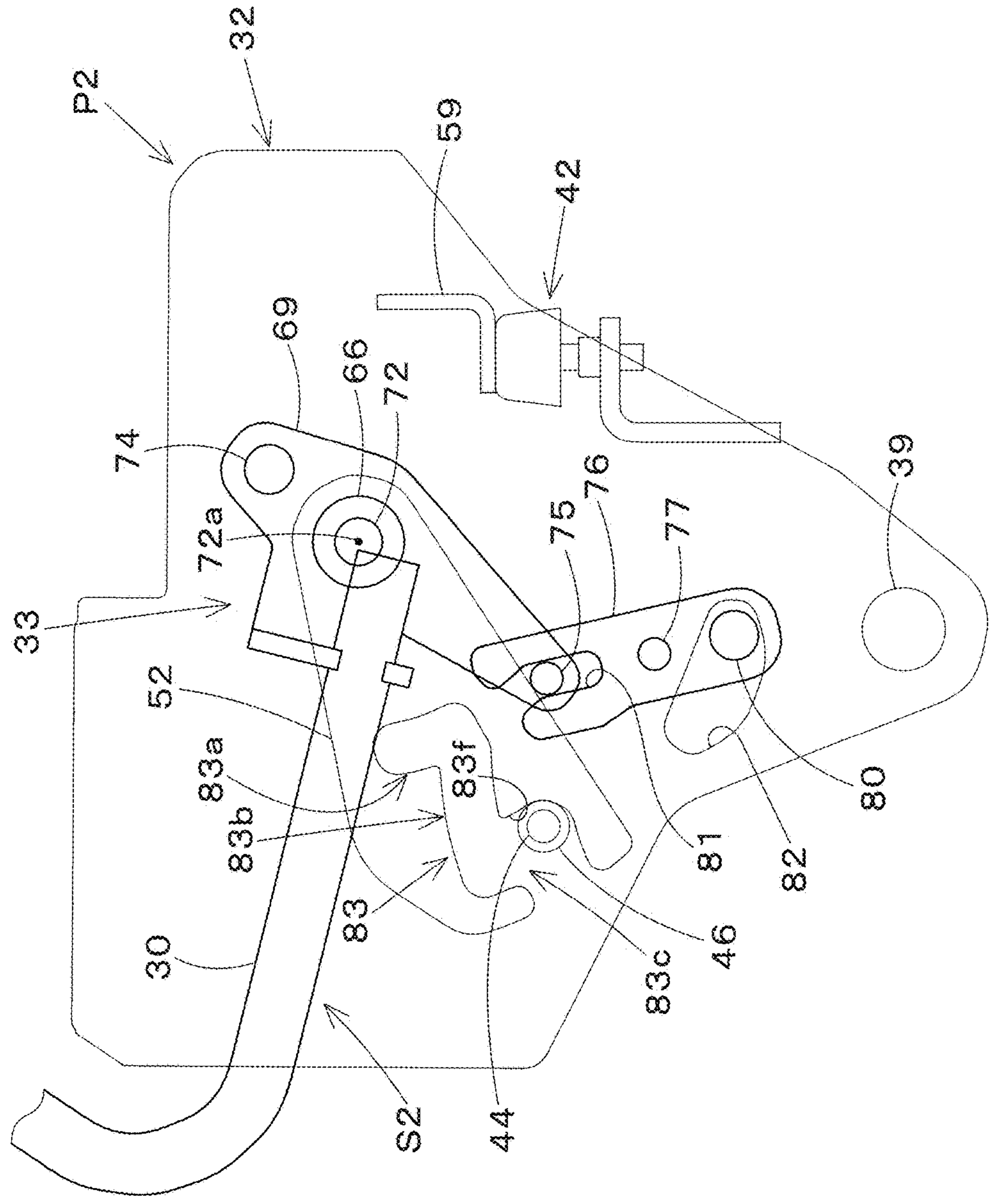
FIG. 22 is a schematic side view of the lever in a pulled-up position, the movable body in the raised position, and the switching mechanism.

Also, in a state illustrated in FIGS. 20 and 21, in which the operation lock lever 30 has been further pulled up from the position illustrated in FIGS. 16 and 17 and the movable body 32 has rotated about the first support shaft 39, the roller 46 is located at a front end portion of the third groove portion 83*c*. When the roller 46 is located at the front end portion of the third groove portion 83*c*, as illustrated in FIG. 20, the contact plate 59 is in contact with the position restrictor 42, and the rotation of the movable body 32 in the raising direction is restricted. That is, the movable body 32 is in the raised position P2. Also, in this state, the roller 46 can relatively move about the second support shaft 72 in the third groove portion 83*c*. That is, the third groove portion 83*c* allows the operation lock lever 30 to rotate about the second support shaft 72 relative to the movable body 32 located in the raised position P2. When the operation lock lever 30 is further pulled up from the position illustrated in FIG. 20 to bring the operation lock lever 30 to the pulled-up position S2 illustrated in FIG. 22, the roller 46 is located at a rear end portion in the third groove portion 83*c*. In this position, an upper edge (locking portion) 83*f* of the third groove portion 83*c* is in contact with the roller 46, and therefore the downward rotation of the guide plate 52 about the first support shaft 39 is restricted. Accordingly, the movable body 32 is restricted from rotating in the lowering direction about the first support shaft 39. That is, the third groove portion 83*c* has the locking portion 83*f* that restricts the movable body 32 from rotating in the lowering direction from the raised position P2 when the operation lock lever 30 is in the pulled-up position S2.

Next, a motion of the switching mechanism 33 will be described with reference to FIGS. 14 to 23.

In the state in which the movable body 32 is in the lowered position P1 and the operation lock lever 30 is in the pushed-down position S1 as illustrated in FIG. 14, a central axis 84 of the tension spring 47 is located forward of the second support shaft 72 as illustrated in FIG. 15, and the biasing force of the tension spring 47 acts in the direction in which the operation lock lever 30 is pulled down. In the state in which the operation lock lever 30 is in the pushed-down position S1, the roller 46 is located at the front end portion of the first groove portion 83*a*, and the rotation of the operation lock lever 30 in the push-down direction is restricted. Therefore the operation lock lever 30 is held in the pushed-down position S1 by the biasing force of the tension spring 47.

When the operation lock lever 30 is pulled up from the state in the pushed-down position S1 illustrated in FIG. 14 about the second support shaft 72, the movable body 32 remains in the lowered position P1, and the roller 46 relatively moves rearward in the first groove portion 83*a*. Therefore the operation lock lever 30 and the guide plate 52 rotate in the raising direction about the second support shaft 72 (see FIG. 16). In so doing, the rotational body 69 rotates clockwise together with the operation lock lever 30, the first spring hook portion 74 moves rearward, and the first engagement portion 75 moves forward. Also, the second engagement portion 81 moves forward as the first engagement portion 75 moves forward, the link 76 rotates counterclockwise about the third support shaft 77, and the second spring hook portion 80 moves rearward. That is, the first spring hook portion 74 and the second spring hook portion 80 move to the same side. When the first spring hook portion 74 and the second spring hook portion 80 move rearward, the central axis 84 of the tension spring 47 moves in a direction toward the axis 72*a* of the second support shaft 72.

As illustrated in FIGS. 16 and 17, when the roller 46 moves to the rear end portion of the first groove portion 83*a*, the movable body 32 is allowed to rotate in the raising direction about the first support shaft 39. Also, in the state in which the roller 46 is located at the rear end portion of the first groove portion 83*a*, the first spring hook portion 74, the second support shaft 72, and the third support shaft 77 are arranged substantially on a straight line.

Figure 18:
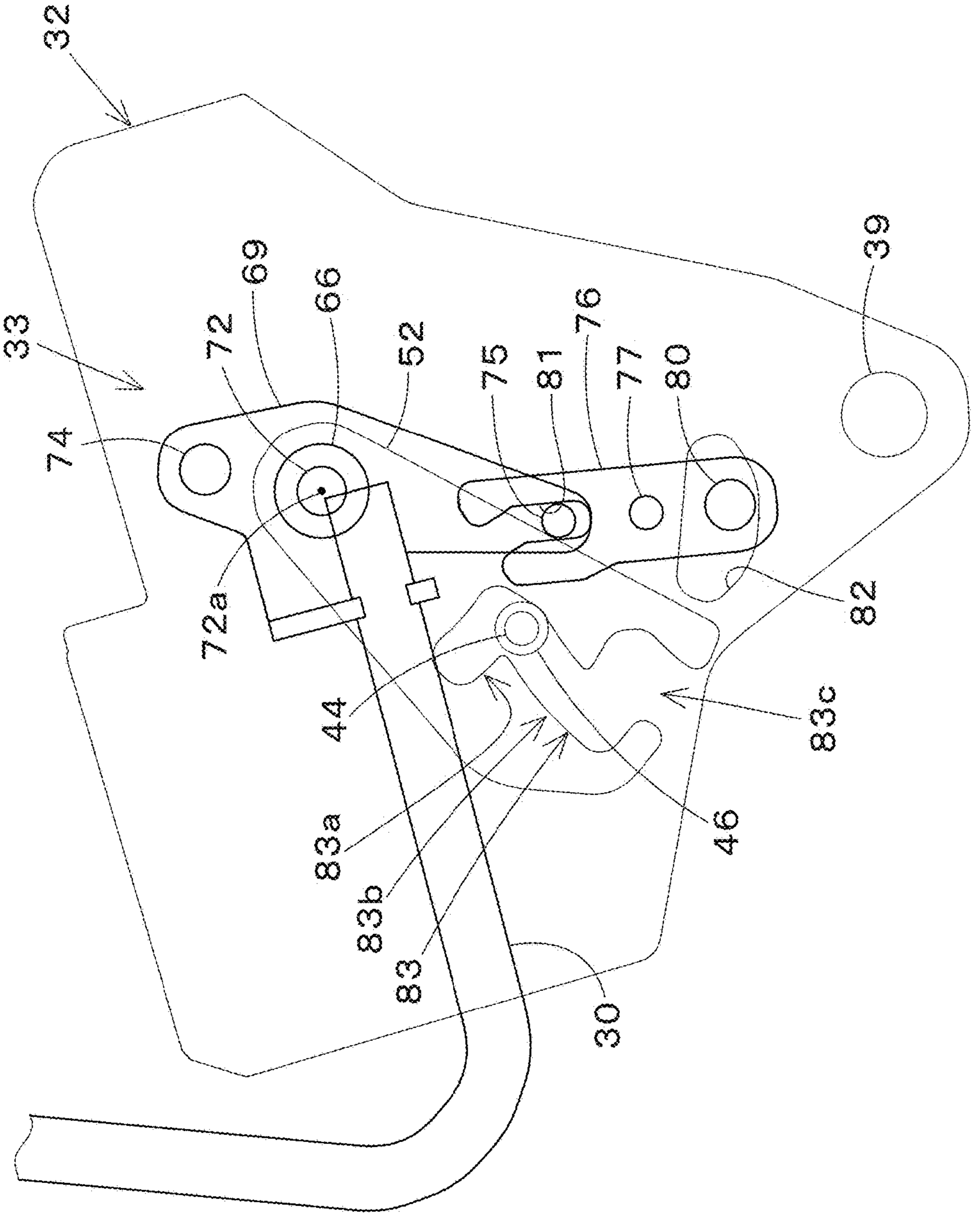
FIG. 18 is a schematic side view of the movable body in the middle of rotation, the lever, and the switching mechanism.
Figure 19:
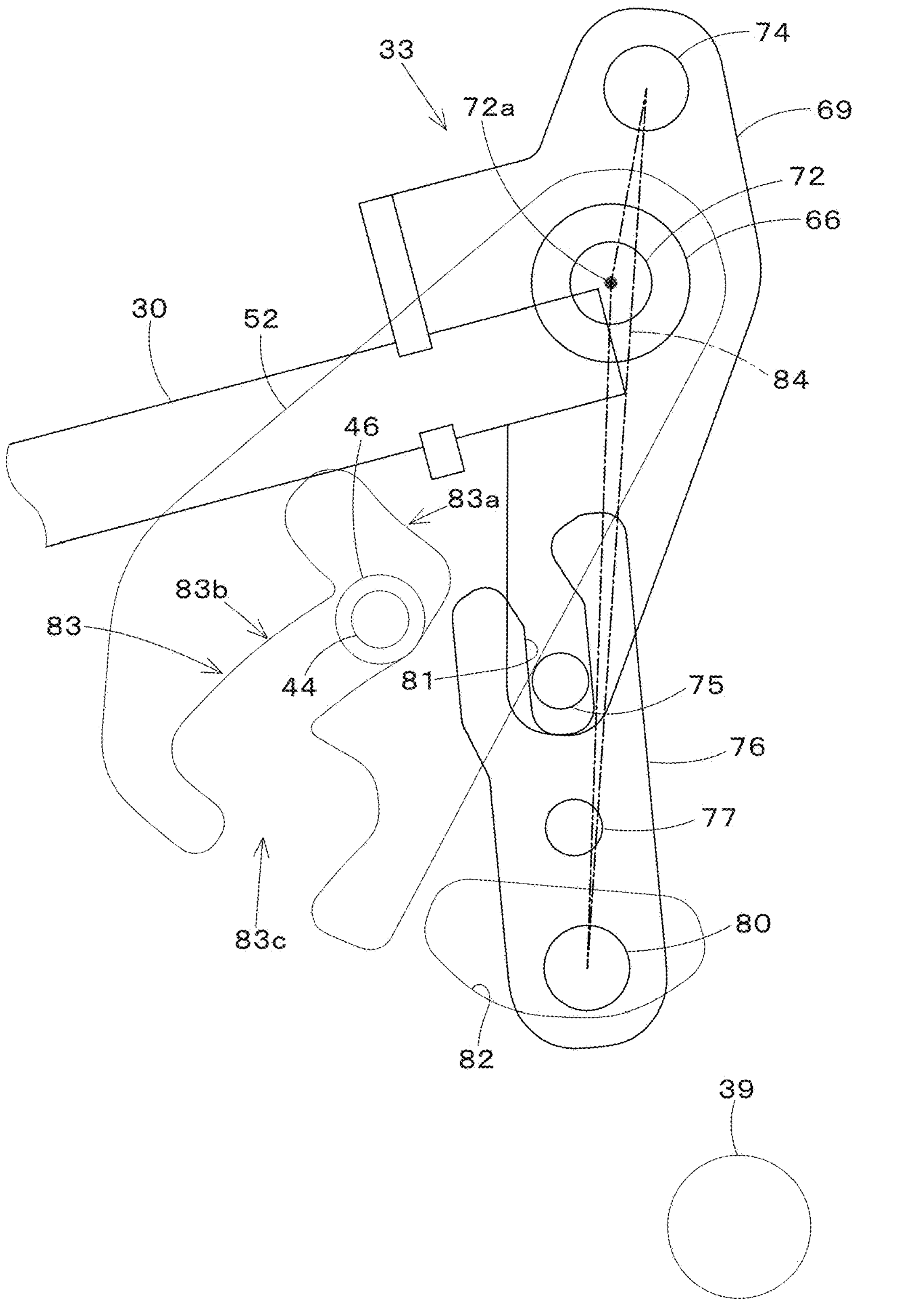
FIG. 19 is an enlarged view of the switching mechanism in FIG. 18.

When the operation lock lever 30 is further pulled up from the state illustrated in FIG. 16, the roller 46 relatively moves in the upper portion toward the lower portion of the second groove portion 83*b* (see FIGS. 18 and 19). When the roller 46 relatively moves in the upper portion of the second groove portion 83*b*, a force in the raising direction is transferred from the operation lock lever 30 to the movable body 32 via the second support shaft 72 and the support tube 66, so that the movable body 32 rotates in the raising direction about the first support shaft 39, and the operation lock lever 30 and the guide plate 52 also rotate in the pull-up direction about the second support shaft 72. When the operation lock lever 30 rotates in the pull-up direction about the second support shaft 72, similarly to the above-described motion, the first spring hook portion 74 and the second spring hook portion 80 move rearward, and the central axis 84 of the tension spring 47 moves rearward in a direction away from the axis 72*a* of the second support shaft 72 as illustrated in FIG. 19, so that the biasing force of the tension spring 47 is switched to the direction in which the operation lock lever 30 is pulled up.

When the operation lock lever 30 is further pulled up from the state illustrated in FIG. 18 and the roller 46 relatively moves from the middle portion to the lower end portion of the second groove portion 83*b*, the movable body 32, the operation lock lever 30, the guide plate 52, the rotational body 69, and the link 76 rotate together in the raising direction about the first support shaft 39.

As illustrated in FIGS. 20 and 21, when the roller 46 relatively moves to the lower end portion of the second groove portion 83*b*, the movable body 32 is in the raised position P2, and the contact plate 59 is in contact with the position restrictor 42. Therefore the rotation of the movable body 32 in the raising direction is restricted. The position of the operation lock lever 30 which has been operated to rotate the movable body 32 to the raised position P2 is not the pulled-up position S2 but is a raising-operation position S3 short of the pulled-up position S2. When the operation lock lever 30 is in the raising-operation position S3, the roller 46 is located at the front end portion of the third groove portion 83*c* (the lower end portion of the second groove portion 83*b*) as illustrated in FIG. 20.

Figure 23:
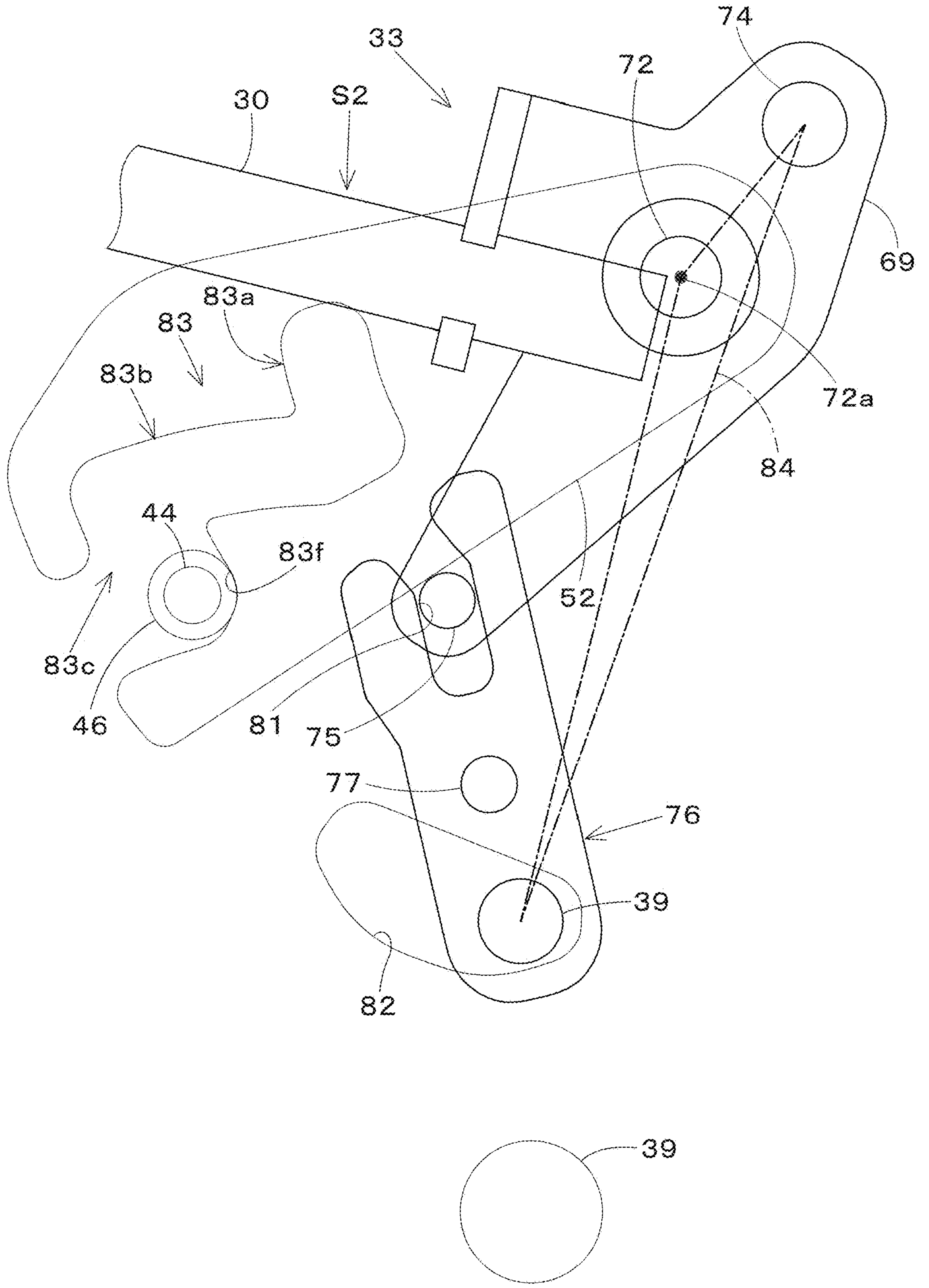
FIG. 23 is an enlarged view of the switching mechanism in FIG. 22.

When the operation lock lever 30 is further pulled up from the raising-operation position S3 relative to the movable body 32 in the raised position P2, the guide plate 52 rotates forward about the second support shaft 72, the first spring hook portion 74 and the second spring hook portion 80 move rearward similarly to the above-described motion, and the central axis 84 of the tension spring 47 further moves in the direction away from the axis 72*a* of the second support shaft 72 as illustrated in FIG. 23. Therefore the biasing force of the tension spring 47 in the direction in which the operation lock lever 30 is pulled up further increases.

When the operation lock lever 30 is pushed down from the pulled-up position S2 to the pushed-down position S1, the biasing force of the tension spring 47 is switched by a motion reverse to the above-described motion.

The switching motion for the biasing force of the tension spring 47 is described in other words. It is assumed that the rear to which the first spring hook portion 74 moves in a case where the operation lock lever 30 is operated to be pulled up is a first side, and the front opposite to the first side is a second side (see FIG. 15). When the operation lock lever 30 is operated to be pulled up and the rotational body 69 rotates about the second support shaft 72, the first spring hook portion 74 moves to the first side (rear) while the first engagement portion 75 and the second engagement portion 81 move to the second side (front) and the second spring hook portion 80 moves to the first side (rear). When the operation lock lever 30 is pushed down and the rotational body 69 rotates about the second support shaft 72, the first spring hook portion 74 moves to the second side (front) while the first engagement portion 75 and the second engagement portion 81 move to the first side (rear) and the second spring hook portion 80 moves to the second side. With this, the central axis 84 of the tension spring 47 moves to the first side (rear) of the second support shaft 72 or the second side (front) of the second support shaft 72, and the direction of the biasing force of the tension spring 47 is switched. That is, the direction of the biasing force of the tension spring 47 acting on the operation lock lever 30 is switched between the direction in which the operation lock lever 30 is pulled down and the direction in which the operation lock lever 30 is pulled up as the operation lock lever 30 is operated.

Also, when the operation lock lever 30 is in the pulled-up position S2, the roller 46 is located at the rear end portion of the third groove portion 83*c*, so that the rotation of the operation lock lever 30 in the pull-up direction is restricted. Thus, in the state in which the operation lock lever 30 is in the pulled-up position S2, the operation lock lever 30 is held in the pulled-up position S2 by the biasing force of the tension spring 47.

According to the above, the second spring hook portion 80 moves to the side to which the first spring hook portion 74 is moved by the rotation of the link 76 due to the movement of the first engagement portion 75 by the operation of the operation lock lever 30. Accordingly, the central axis 84 of the tension spring 47 can be sufficiently separated from the second support shaft 72 in the pushed-down position S1 and the pulled-up position S2. Even when the rotation angle of the movable body 32 is small, the biasing force (holding force) of the tension spring 47 on the operation lock lever 30 can be exerted.

Example embodiments of the present invention provide lever devices 27 and working machines 1 described in the following items.

(Item 1) A lever device 27 including a fixed body 31, a movable body 32 rotatably supported by the fixed body 31 via a first support shaft 39, a lever 30 to be operated to rotate the movable body 32 about the first support shaft 39, the lever 30 being supported by a second support shaft 72 provided at the movable body 32 such that the lever 30 is rotatable between a pushed-down position S1 and a pulled-up position S2, the pulled-up position S2 being a position of the lever 30 rotated upward from the pushed-down position S1, a tension spring 47 to bias the lever 30, and a switching mechanism 33 to switch a direction of a biasing force of the tension spring 47 to change between when the lever is in the pushed-down position and when the lever is in the pulled-up position such that the biasing force of the tension spring 47 acts in a direction in which the lever 30 is pulled down when the lever 30 is in the pushed-down position S1 and acts in a direction in which the lever 30 is pulled up when the lever 30 is in the pulled-up position S2, wherein the switching mechanism 33 includes a rotational body 69 to rotate together with the lever 30 about the second support shaft 72, the rotational body 69 including a first spring hook portion 74 and a first engagement portion 75 positioned such that an axis of the second support shaft 72 is located between the first spring hook portion 74 and the first engagement portion 75, and a link 76 rotatably supported by the movable body 32 via a third support shaft 77, the link 76 including a second spring hook portion 80 and a second engagement portion 81 positioned such that an axis of the third support shaft 77 is located between the second spring hook portion 80 and the second engagement portion 81, the tension spring 47 is connected between the first spring hook portion 74 and the second spring hook portion 80, and the link 76 is positioned such that the first engagement portion 75 and the second engagement portion 81 are engageable with each other and such that the first engagement portion 75 is movable by rotation of the rotational body 69 about the second support shaft 72 to cause the second engagement portion 81 to move and rotate about the third support shaft 77 to move the second spring hook portion 80 to a side to which the first spring hook portion 74 moves.

With the lever device 27 according to item 1, when the link 76 rotates as the first engagement portion 75 is moved by operation of the lever 30, the second spring hook portion 80 moves to the side to which the first spring hook portion 74 moves. Accordingly, the central axis of the tension spring 47 can be separated to an appropriate position from the center of the second support shaft 72 in the pushed-down position S1 and the pulled-up position S2, and the biasing force of the tension spring 47 can be exerted on the lever 30 even when the angle of rotation of the movable body 32 is small.

(Item 2) The lever device 27 according to item 1, wherein one of the first engagement portion 75 and the second engagement portion 81 includes a pin parallel to the second support shaft 72 or the third support shaft 77, and the other of the first engagement portion 75 and the second engagement portion 81 includes a groove or a hole to receive the pin.

The lever device 27 according to item 2 achieves the following: when the link 76 rotates as the first engagement portion 75 is moved by operation of the lever 30, the second spring hook portion 80 is moved to the side to which the first spring hook portion 74.

(Item 3) The lever device 27 according to item 1 or 2, wherein a side to which the first spring hook portion 74 moves when the lever 30 is pulled up is a first side, and a side opposite to the first side is a second side, and the lever device 27 is configured such that the direction of the biasing force of the tension spring 47 which acts on the lever 30 as the lever 30 is operated is switched between the direction in which the lever 30 is pulled down and the direction in which the lever 30 is pulled up because: when the lever 30 is pulled up and the rotational body 69 rotates about the second support shaft 72, the first spring hook portion 74 moves to the first side while the first engagement portion 75 and the second engagement portion 81 move to the second side and the second spring hook portion 80 moves to the first side; and when the lever 30 is pushed down and the rotational body 69 rotates about the second support shaft 72, the first spring hook portion 74 moves to the second side while the first engagement portion 75 and the second engagement portion 81 move to the first side and the second spring hook portion 80 moves to the second side.

Also with the lever device 27 according to item 3, the central axis of the tension spring 47 can be appropriately separated from the center of the second support shaft 72 in the pushed-down position S1 and the pulled-up position S2, and the biasing force of the tension spring 47 can be exerted on the lever 30 even when the rotation angle of the movable body 32 is small.

(Item 4) The lever device 27 according to any one of items 1 to 3, wherein the movable body 32 is rotatable between a lowered position P1 and a raised position P2, the raised position P2 being a position of the movable body 32 rotated upward from the lowered position P1 about the first support shaft 39, the pushed-down position S1 of the lever 30 corresponds to the lowered position P1 of the movable body 32, the lever 30 is configured to be operated to a raising-operation position S3 which is a position of the lever 30 operated to rotate the movable body 32 to the raised position P2, and the pulled-up position S2 of the lever 30 is a position of the lever 30 further pulled up from the raising-operation position S3 relative to the movable body 32 in the raised position P2.

With the lever device 27 according to item 4, the movement amounts of the first spring hook portion 74 and the second spring hook portion 80 can be increased when the lever 30 is raised.

(Item 5) The lever device 27 according to item 4, further including a guide body 43 provided at the fixed body 31, and a guide plate 52 including a guide groove 83 to receive the guide body 43 and configured to rotate together with the lever 30 about the second support shaft 72, wherein the guide groove 83 includes a first groove portion 83*a* to restrict the movable body 32 in the lowered position P1 from rotating in a raising direction and allow the lever 30 to rotate in the direction in which the lever 30 is pulled up, a second groove portion 83*b* to allow the movable body 32 to rotate by an operation of the lever 30, and a third groove portion 83*c* to restrict the movable body 32 in the raised position P2 from rotating in the raising direction and allow the lever 30 to rotate about the second support shaft 72, and the third groove portion 83*c* includes a locking portion 83*f* to restrict the movable body 32 from rotating in a lowering direction from the raised position P2 when the lever 30 is in the pulled-up position S2.

With the lever device 27 according to item 5, in the configuration in which the biasing force of the tension spring 47 can be exerted on the lever 30 even when the angle of rotation of the movable body 32 is small, the movable body 32 can be restricted from unintentionally rotating downward.

(Item 6) The lever device 27 according to item 5, wherein the movable body 32 includes a support tube 66 to rotatably support the second support shaft 72 about an axis thereof, the lever 30 is attached to the second support shaft 72 at one of opposite ends in an axial direction of the support tube 66, and the guide plate 52 is fixed to the second support shaft 72 at the other of the opposite ends in the axial direction of the support tube 66.

With the lever device 27 according to item 6, the guide plate 52 can be easily attached to the movable body 32.

(Item 7) A working machine 1 according to the present example embodiment includes the lever device 27 according to any one of items 1 to 6.

(Item 8) The working machine 1 according to item 7, wherein the lever 30 is an operation lock lever to switch one or more actuators included in the working machine 1 between an operable state and an inoperable state.

With the working machine 1 according to item 8, even when the angle of rotation of the movable body 32 is small, the biasing force of the tension spring 47 can be exerted on the lock lever.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A lever device comprising:

a fixed body;

a movable body rotatably supported by the fixed body via a first support shaft;

a lever to be operated to rotate the movable body about the first support shaft, the lever being supported by a second support shaft provided at the movable body such that the lever is rotatable between a pushed-down position and a pulled-up position, the pulled-up position being a position of the lever rotated upward from the pushed-down position;

a tension spring to bias the lever; and a switching mechanism to switch a direction of a biasing force of the tension spring to change between when the lever is in the pushed-down position and when the lever is in the pulled-up position such that the biasing force of the tension spring acts in a direction in which the lever is pulled down when the lever is in the pushed-down position and acts in a direction in which the lever is pulled up when the lever is in the pulled-up position;

wherein the switching mechanism includes:

a rotational body to rotate together with the lever about the second support shaft, the rotational body including a first spring hook portion and a first engagement portion positioned such that an axis of the second support shaft is located between the first spring hook portion and the first engagement portion; and a link rotatably supported by the movable body via a third support shaft, the link including a second spring hook portion and a second engagement portion positioned such that an axis of the third support shaft is located between the second spring hook portion and the second engagement portion;

the tension spring is connected between the first spring hook portion and the second spring hook portion; and the link is positioned such that the first engagement portion and the second engagement portion are engageable with each other and such that the first engagement portion is movable by rotation of the rotational body about the second support shaft to cause the second engagement portion to move and rotate about the third support shaft to move the second spring hook portion to a side to which the first spring hook portion moves.

2. The lever device according to claim 1, wherein one of the first engagement portion and the second engagement portion includes a pin parallel to the second support shaft or the third support shaft; and the other of the first engagement portion and the second engagement portion includes a groove or a hole to receive the pin.

3. The lever device according to claim 1, wherein a side to which the first spring hook portion moves when the lever is pulled up is a first side, and a side opposite to the first side is a second side; and the lever device is configured such that the direction of the biasing force of the tension spring which acts on the lever as the lever is operated is switched between the direction in which the lever is pulled down and the direction in which the lever is pulled up because:

when the lever is pulled up and the rotational body rotates about the second support shaft, the first spring hook portion moves to the first side while the first engagement portion and the second engagement portion move to the second side and the second spring hook portion moves to the first side; and when the lever is pushed down and the rotational body rotates about the second support shaft, the first spring hook portion moves to the second side while the first engagement portion and the second engagement portion move to the first side and the second spring hook portion moves to the second side.

4. The lever device according to claim 1, wherein the movable body is rotatable between a lowered position and a raised position, the raised position being a position of the movable body rotated upward from the lowered position about the first support shaft;

the pushed-down position of the lever corresponds to the lowered position of the movable body;

the lever is configured to be moved to a raising-operation position which is a position of the lever operated to rotate the movable body to the raised position; and the pulled-up position of the lever is a position of the lever further pulled up from the raising-operation position relative to the movable body in the raised position.

5. The lever device according to claim 4, further comprising:

a guide body provided at the fixed body; and a guide plate including a guide groove to receive the guide body and configured to rotate together with the lever about the second support shaft; wherein the guide groove includes:

a first groove portion to restrict the movable body in the lowered position from rotating in a raising direction and allow the lever to rotate in the direction in which the lever is pulled up;

a second groove portion to allow the movable body to rotate by an operation of the lever; and a third groove portion to restrict the movable body in the raised position from rotating in the raising direction and allow the lever to rotate about the second support shaft; and the third groove portion includes a locking portion to restrict the movable body from rotating in a lowering direction from the raised position when the lever is in the pulled-up position.

6. The lever device according to claim 5, wherein the movable body includes a support tube to rotatably support the second support shaft about an axis thereof;

the lever is attached to the second support shaft at one of opposite ends in an axial direction of the support tube; and the guide plate is fixed to the second support shaft at the other of the opposite ends in the axial direction of the support tube.

7. A working machine comprising the lever device according to claim 1.

8. The working machine according to claim 7, wherein the lever is an operation lock lever to switch one or more actuators included in the working machine between an operable state and an inoperable state.

* * * * *